US012810855B2

(12) United States Patent
Khair

(10) Patent No.: US 12,810,855 B2
(45) Date of Patent: Nov. 24, 2026

(54) TOUCHLESS OPERATION OF MEDICAL DEVICES VIA LARGE LANGUAGE MODELS

(71) Applicant: GE Precision Healthcare LLC, Waukesha, WI (US)

(72) Inventor: Mohammad Mohammad Khair, Milwaukee, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 159 days.

(21) Appl. No.: 18/433,978

(22) Filed: Feb. 6, 2024

(65) Prior Publication Data

US 2025/0252952 A1 Aug. 7, 2025

(51) Int. Cl.
*G06F 40/35* (2020.01)
*G10L 15/183* (2013.01)
*G10L 15/22* (2006.01)

(52) U.S. Cl.
CPC ............ *G10L 15/22* (2013.01); *G10L 15/183* (2013.01); *G10L 2015/223* (2013.01)

(58) Field of Classification Search
None
See application file for complete search history.

(56) References Cited

U.S. PATENT DOCUMENTS 9,905,224 B2 2/2018 Nissan et al.
11,501,089 B2 11/2022 Kim et al.
12,399,923 B1 * 8/2025 Nataneli ............. G06F 16/3347
12,403,528 B2 * 9/2025 Tremblay ............... B22D 46/00
(Continued)

FOREIGN PATENT DOCUMENTS

CN 105615833 A 6/2016
CN 116340778 A 6/2023
(Continued)

OTHER PUBLICATIONS

"Langchain" Langchain, https://www.langchain.com/, Last Accessed Jan. 18, 2024, 5 pages.
(Continued)

*Primary Examiner* — Seong-Ah A Shin
(74) *Attorney, Agent, or Firm* — Amin, Turocy & Watson, LLP

(57) ABSTRACT

Systems or techniques that facilitate touchless operation of medical devices via large language models are provided. In various embodiments, a system can access, via a microphone associated with a medical device, a first natural language sentence spoken by a user of the medical device, wherein the first natural language sentence requests that the medical device perform an equipment operation. In various aspects, the system can: extract, from an encoder portion of a large language model, an embedding corresponding to the first natural language sentence; identify the equipment operation, by comparing the embedding to a plurality of embeddings respectively corresponding to a plurality of available equipment operations of the medical device, wherein the equipment operation is identified as whichever of the plurality of available equipment operations whose embedding is most similar to the embedding of the first natural language sentence; and instruct the medical device to perform the equipment operation.

20 Claims, 14 Drawing Sheets

(56) References Cited

U.S. PATENT DOCUMENTS

| | | | | |
|---|---|---|---|---|
| 12,511,487 | B2 * | 12/2025 | Marwah | G06F 40/30 |
| 12,511,497 | B1 * | 12/2025 | Oks | G06F 40/47 |
| 12,518,740 | B1 * | 1/2026 | Carre | G06F 40/20 |
| 2017/0357637 | A1 * | 12/2017 | Nell | G06F 40/35 |
| 2022/0101847 | A1 * | 3/2022 | Receveur | G10L 15/22 |
| 2022/0246143 | A1 | 8/2022 | Apsingekar et al. | |
| 2022/0406296 | A1 | 12/2022 | Cho et al. | |
| 2023/0087504 | A1 | 3/2023 | Rothbauer | |
| 2023/0248468 | A1 * | 8/2023 | Matsuura | A61B 90/361 600/109 |
| 2023/0270390 | A1 | 8/2023 | Hays et al. | |
| 2023/0386450 | A1 * | 11/2023 | Eby | G06F 40/284 |
| 2024/0265269 | A1 * | 8/2024 | Chen | G06N 3/044 |
| 2024/0311575 | A1 * | 9/2024 | Baeuml | G06F 40/35 |
| 2024/0330597 | A1 * | 10/2024 | Temraz | G06F 16/3329 |
| 2024/0361973 | A1 * | 10/2024 | Kuhrt | G06V 40/16 |
| 2024/0362412 | A1 * | 10/2024 | Tsvetkov | G06F 16/3346 |
| 2024/0406166 | A1 * | 12/2024 | Bell | G06F 16/3329 |
| 2025/0005051 | A1 * | 1/2025 | Khosla | G06F 16/3329 |
| 2025/0037710 | A1 * | 1/2025 | Yadav | G06F 40/20 |
| 2025/0078812 | A1 * | 3/2025 | Xiao | G06N 3/0495 |
| 2025/0095638 | A1 * | 3/2025 | Cho | G10L 15/063 |
| 2025/0111073 | A1 * | 4/2025 | Ho | G06F 21/602 |
| 2025/0178624 | A1 * | 6/2025 | Narayanan | G06N 3/044 |
| 2025/0201233 | A1 * | 6/2025 | Datta | G06F 40/30 |
| 2025/0201241 | A1 * | 6/2025 | Zhong | G06F 16/33295 |
| 2025/0225978 | A1 * | 7/2025 | Chang | G10L 15/26 |
| 2025/0278175 | A1 * | 9/2025 | Herman | G06F 3/0484 |

FOREIGN PATENT DOCUMENTS

| | | | |
|---|---|---|---|
| CN | 116580801 | A | 8/2023 |
| CN | 116630295 | A | 8/2023 |
| CN | 116756579 | A | 9/2023 |
| CN | 116759074 | A | 9/2023 |
| DE | 102006045719 | B4 | 8/2008 |

OTHER PUBLICATIONS

"Llamaindex" Llamaindex, https://www.llamaindex.ai/, Last Accessed Jan. 18, 2024, 6 pages.

META "Seamless Communication" ai.meta.com, https://ai.meta.com/research/seamless-communication/, Last Accessed Feb. 1, 2024, 9 pages.

"Function Calling" OpenAI, https://platform.openai.com/docs/guides/function-calling, Last Accessed Feb. 6, 2024, 3 pages.

"Function Calling Llama 2 + Yi + Mistral + Zephyr + Deepseek Coder Models (version 2)" Hugging Face, https://huggingface.co/Trelis/Llama-2-7b-chat-hf-function-calling-v2, Last Accessed Feb. 6, 2024, 17 pages.

* cited by examiner

TOUCHLESS OPERATION OF MEDICAL DEVICES VIA LARGE LANGUAGE MODELS

TECHNICAL FIELD

The subject disclosure relates generally to medical devices, and more specifically to touchless operation of medical devices via large language models.

BACKGROUND

A medical device can be deployed in the field to measure health data of medical patients. To prevent contaminating the medical device, it can be desired to operate the medical device during such deployment in a touchless fashion. Existing techniques facilitate such touchless operation via speech transcription and keyword searching. Unfortunately, such existing techniques are rigid, inflexible, and prone to error.

Accordingly, systems or techniques that can address one or more of these technical problems can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate touchless operation of medical devices via large language models are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access, via a microphone associated with a medical device, a first natural language sentence spoken by a user of the medical device, wherein the first natural language sentence can request that the medical device perform an equipment operation. In various aspects, the computer-executable components can comprise a model component that can: extract, from an encoder portion of a large language model, an embedding corresponding to the first natural language sentence; identify the equipment operation, by comparing the embedding to a plurality of embeddings respectively corresponding to a plurality of available equipment operations of the medical device, wherein the equipment operation can be identified as whichever of the plurality of available equipment operations whose embedding is most similar to the embedding of the first natural language sentence; and instruct the medical device to perform the equipment operation.

According to one or more embodiments, a computer-implemented method is provided. In various embodiments, the computer-implemented method can comprise accessing, by a processor and via a microphone associated with a medical device, a first natural language sentence spoken by a user of the medical device, wherein the first natural language sentence can request that the medical device perform an equipment operation. In various aspects, the computer-implemented method can comprise extracting, by the processor and from an encoder portion of a large language model, an embedding corresponding to the first natural language sentence. In various instances, the computer-implemented method can comprise identifying, by the processor, the equipment operation, by comparing the embedding to a plurality of embeddings respectively corresponding to a plurality of available equipment operations of the medical device, wherein the equipment operation can be identified as whichever of the plurality of available equipment operations whose embedding is most similar to the embedding of the first natural language sentence. In various cases, the computer-implemented method can comprise instructing, by the processor, the medical device to perform the equipment operation.

According to one or more embodiments, a computer program product for facilitating touchless operation of medical devices via large language models is provided. In various embodiments, the computer program product can comprise a non-transitory computer-readable memory having program instructions embodied therewith. In various aspects, the program instructions can be executable by a processor to cause the processor to access, via a microphone of a medical device, a natural language sentence that is spoken by a user of the medical device. In various instances, the program instructions can be further executable to cause the processor to extract, from an encoder portion of a large language model, an embedding corresponding to the natural language sentence. In various cases, the program instructions can be further executable to cause the processor to compare the embedding to a plurality of embeddings respectively corresponding to a plurality of available equipment operations of the medical device. In various aspects, the program instructions can be further executable to cause the processor to determine, in response to at least one of the plurality of embeddings being within a threshold level of similarity to the embedding, that the natural language sentence requests that the medical device perform one of the plurality of available equipment operations. In various instances, the program instructions can be further executable to cause the processor to determine, in response to none of the plurality of embeddings being within the threshold level of similarity to the embedding, that the natural language sentence asks about a medical patient being monitored by the medical device.

DETAILED DESCRIPTION

Figure 1:
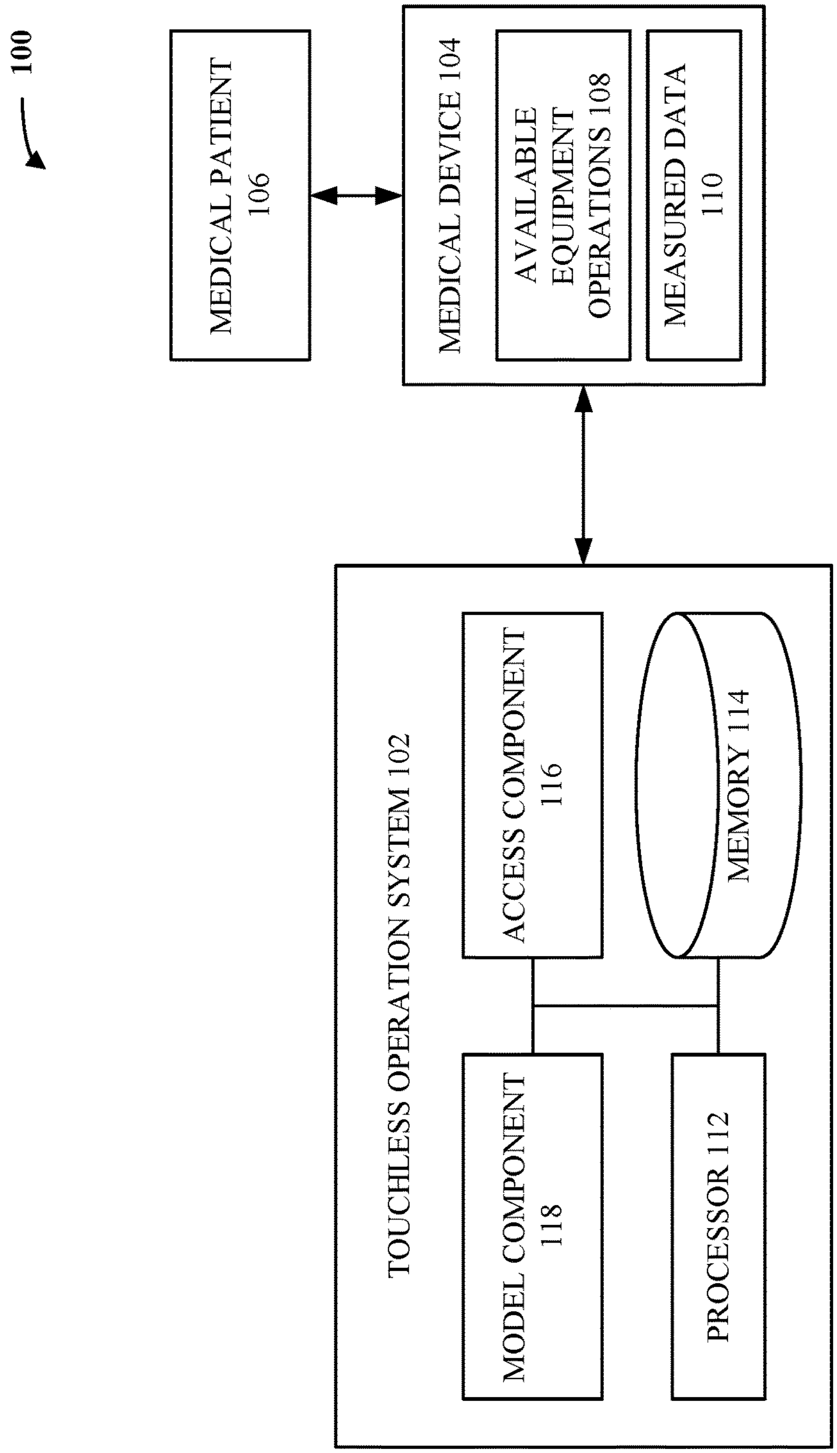
FIG. 1 illustrates a block diagram of an example, non-limiting system that facilitates touchless operation of medical devices via large language models in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A medical device (e.g., a computed tomography (CT) scanner, a magnetic resonance imaging (MRI) scanner, an X-ray scanner, an ultrasound scanner, a positron emission tomography (PET) scanner, a nuclear medicine (NM) scanner, a blood pressure gauge, a pulse tracker, a pulse oximeter, an electrocardiogram monitor, a seismocardiogram monitor, a phonocardiogram monitor, a clinical thermometer, a clinical endoscope, a clinical blood glucose monitor) can be deployed in the field to measure health data (e.g., CT images, MRI images, X-ray images, ultrasound images, PET images, NM images, blood pressure measurements, heart rate measurements, blood oxygen concentrations, electrocardiogram traces, seismocardiogram traces, phonocardiogram traces, temperature measurements, endoscopic video feeds, blood glucose measurements) of medical patients (e.g., humans, animals, or otherwise).

To prevent contaminating the medical device, it can be desired to operate the medical device during such deployment in a touchless fashion. For instance, suppose that a user of the medical device is afflicted with a contagious disease or pathogen (e.g., COVID-19). In such case, tactile or touch-based operation of the medical device by the user can cause the user to leave disease or pathogen residue on physical interfaces (e.g., touchscreens, styluses, knobs, keyboards, buttons) of the medical device. Accordingly, other users that subsequently operate the medical device in tactile or touch-based fashion can have an increased likelihood of becoming infected by such residue, thereby spreading the disease or pathogen.

So, it can be desired to instead operate the medical device in touchless fashion. Existing techniques facilitate such touchless operation via speech transcription and keyword searching. In particular, suppose that a user desires for the medical device to perform some given operation. When existing techniques are implemented, the user vocally commands the medical device to perform the given operation, speech recognition software transcribes that spoken command into natural language text, and the given operation is identified by performing keyword searching based on the natural language text. Specifically, there are defined keywords that are known to correspond to available or possible operations of the medical device, and existing techniques involve determining whether or not the natural language text recites any of those defined keywords. Whichever of those available or possible operations whose keyword is recited in the natural language text can be determined to be the given operation that the user desires to be performed.

Unfortunately, such existing techniques are rigid, inflexible, or otherwise prone to error. Indeed, the inventors of various embodiments described herein recognized that, because existing techniques rely upon keyword searching, such existing techniques are unlikely to function properly in situations where the user's vocabulary does not neatly or perfectly match that encompassed by the defined keywords representing the available or possible operations of the medical device. That is, existing techniques can be considered as a 'magic word' test that works properly only when the user explicitly verbalizes the defined keywords of the medical device. If the user instead verbalizes synonyms for those defined keywords but does not verbalize the defined keywords themselves, such existing techniques are unable to identify which available or possible operation the user desires to be performed.

For example, suppose that the medical device is a CT scanner having a motorized or actuatable patient table whose height is adjustable (e.g., the patient table can be outfitted with rotational or linear actuators that can raise or lower the patient table). Accordingly, table height adjustment can be considered as being an available or possible operation that is performable by the CT scanner. Suppose that such operation is known to correspond to the keywords "height" and "table."

Now, suppose that the user verbally says, "Increase the height of the table." When existing techniques are implemented, the CT scanner can: capture, via a microphone, that spoken command; utilize a speech recognition system to transcribe that spoken command into text; and perform keyword searching on that text. Because that text recites the keywords "table" and "height" which are known to correspond to the table height adjustment operation, the CT scanner can determine that the user has requested or commanded the height of the patient table to be adjusted.

Similarly, suppose that the user verbally says, "Raise the table." Again, when existing techniques are implemented, the CT scanner can: capture, via a microphone, that spoken command; utilize a speech recognition system to transcribe that spoken command into text; and perform keyword searching on that text. Because that text recites the keyword "table" which is known to correspond to the table height adjustment operation, the CT scanner can determine that the user has requested or commanded the height of the patient table to be adjusted.

On the other hand, suppose instead that the user says, "Raise the bed." Just as above, when existing techniques are implemented, the CT scanner can: capture, via a microphone, that spoken command; utilize a speech recognition system to transcribe that spoken command into text; and perform keyword searching on that text. However, because that text does not recite any keyword which is known to correspond to the table height adjustment operation (e.g., recites neither "table" nor "height"), the CT scanner can be unable to determine that the user has requested or commanded the height of the patient table to be adjusted. Equivalently, the CT scanner can determine that the user is requesting something about a "bed", but the CT scanner can conclude that it has no available or possible operations pertaining to a "bed."

Moreover, suppose instead that the user says, "Elevate shelf." Again, when existing techniques are implemented, the CT scanner can: capture, via a microphone, that spoken command; utilize a speech recognition system to transcribe that spoken command into text; and perform keyword searching on that text. However, because that text does not recite any keyword which is known to correspond to the table height adjustment operation (e.g., recites neither "table" nor "height"), the CT scanner can be unable to determine that the user has requested or commanded the height of the patient table to be adjusted. Equivalently, the CT scanner can determine that the user is requesting something about a "shelf", but the CT scanner can conclude that it has no available or possible operations pertaining to a "shelf."

Note that "Increase the height of the table," "Raise the table," "Raise the bed," and "Elevate shelf" can all be considered as verbally distinct commands that have synonymous semantic meanings. But despite such synonymous semantic meanings, existing techniques are unable to correctly process all of such commands in touchless fashion, due to their distinct phrasings or verbiage. More generally, the present inventors realized that different users of medical devices can have different educational, professional, or personal backgrounds and thus can have different linguistic or lexicographical idiosyncrasies. Accordingly, such different users can utilize different words or terms to convey the same semantic concepts. Unfortunately, as the present inventors realized, existing techniques rely upon keyword searching and thus are not agnostic to such different words or terms.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate touchless operation of medical devices via large language models (LLMs). In particular, the present inventors realized that various shortcomings or disadvantages of existing techniques can be overcome by leveraging LLM embeddings instead of keyword searching. More specifically, an LLM (e.g., such as ChatGPT or Seamless) can be considered as a deep learning transformer-based neural network that can receive textual, numerical, or graphical input and that can synthesize textual output that is semantically based on such input. To accomplish such synthesis, the LLM can be considered as comprising an encoder portion (also called "tokenizer") and a generative portion (also called "decoder"), where the encoder portion can compute embeddings (e.g., latent vectors) to represent inputted data and where the generative portion can synthesize text based on those embeddings.

The present inventors realized that such embeddings can be utilized to more accurately or reliably facilitate touchless operation of medical devices. Indeed, the available or possible operations that are performable by a medical device can be associated with respective natural language descriptions, and an LLM can be leveraged to compute embeddings for each of those natural language descriptions. Accordingly, when the user verbally speaks a command to the medical device, speech recognition can be implemented to transcribe that spoken command into text, the LLM can be leveraged to compute a given embedding for that text, and that given embedding can be compared to the embeddings respectively generated from the natural language descriptions of the available or possible operations of the medical device. Thus, it can be determined that the user desires the medical device to perform whichever available or possible operation whose embedding is closest to the given embedding.

As described herein, LLM embeddings can be considered as representing (albeit in an obscure or latent fashion) semantic or substantive meanings rather than mere word content. So, different word strings that have synonymous semantic meanings can have similar or close LLM embeddings, notwithstanding being made up of different or non-identical words. In contrast, different word strings that have different or unrelated semantic meanings can have different or far apart LLM embeddings. Therefore, by leveraging LLM embeddings instead of keyword searching, various embodiments described herein can facilitate touchless operation of medical devices without suffering the rigidity or inflexibility of existing techniques.

Various embodiments described herein can be considered as a computerized tool (e.g., any suitable combination of computer-executable hardware or computer-executable software) that can facilitate touchless operation of medical devices via large language models. In various aspects, such computerized tool can comprise an access component or a model component.

In various embodiments, there can be a medical device that monitors or is otherwise clinically associated with a medical patient. In various aspects, the medical device can be any suitable type of medical image-capture equipment or modality (e.g., a CT scanner, an MRI scanner, an X-ray scanner, an ultrasound scanner, a PET scanner, an NM scanner). In various instances, the medical device can instead be any suitable type of diagnostic or vital-sign monitoring equipment or modality (e.g., heart rate monitor, blood pressure monitor, electrocardiogram monitor, phonocardiogram monitor, a clinical endoscope, a clinical visible-spectrum camera). In various cases, the medical device can instead be any suitable type of therapeutic or life-support equipment or modality (e.g., infusion pump, respirator, hemodialysis machine, positive pressure breathing machine, iron lung, aerosol tent or mask, nebulizer, or neonatal incubator or warmer). In various aspects, the medical device can instead be any suitable type of surgical equipment or modality (e.g., robotically-assisted surgery machine for laparoscopic procedures). In various cases, the medical device can instead be any suitable type of bed or harness equipment or modality (e.g., motorized or adjustable hospital bed). In various instances, the medical device can be any suitable combination thereof.

In various cases, the medical device can record, track, or otherwise measure any suitable health data associated with the medical patient (e.g., any suitable data that can be stored or maintained in an electronic medical records (EMR) system). Note that the type, format, or dimensionality of such health data can depend upon the configuration of the medical device (e.g., if the medical device comprises a medical imaging scanner, then the health data can include a medical scanned image of the medical patient; if the medical device comprises a vital-sign monitor, then the health data can include a snapshot or timeseries of a biological vital-sign of the medical patient).

In various aspects, the medical device can be associated with a plurality of available equipment operations. In various instances, each of the plurality of available equipment operations can be or otherwise refer to any suitable type of configurable hardware-based or software-based action that can be performed by the medical device or by any suitable constituent part thereof (e.g., raising or lowering a patient table; rotating a gantry; increasing or decreasing an electrode voltage; increasing or decreasing a radiation level; increasing or decreasing a temperature; increasing or decreasing a fluid pressure or flow rate; moving an actuatable arm or end effector; setting an alarm; recording a clinical observation; performing a scan). In various cases, each of the plurality of available equipment operations can be considered as being a controllable parameter or feature of the medical device that can be selectively configured by a user of the medical device (e.g., by a medical professional or technician who is operating or overseeing the medical device).

In various aspects, the user of the medical device can desire to invoke, activate, configure, alter, manipulate, or otherwise interact with any of the plurality of available equipment operations in a touchless fashion. In various instances, the computerized tool can facilitate such touchless interaction, as described herein.

In various embodiments, the access component of the computerized tool can electronically access a first natural language sentence. In various aspects, the first natural language sentence can request or command that the medical device perform a particular equipment operation from the plurality of available equipment operations. More specifically, the user can verbally speak such request or command, and that spoken verbalization can be audibly captured or recorded by any suitable microphone that is associated with (e.g., that is part of or otherwise integrated or built into) the medical device. In various instances, the access component can electronically receive or retrieve such audio recording from the medical device, and the access component can electronically apply any suitable speech-to-text transcription tools or techniques (e.g., automatic speech recognition (ASR)). In various cases, such application of speech-to-text transcription can yield the first natural language sentence.

In various embodiments, the model component of the computerized tool can electronically store, maintain, control, or otherwise access an LLM. In various aspects, the LLM can exhibit any suitable deep learning internal architecture. For example, the LLM can include any suitable numbers of any suitable types of layers (e.g., input layer, one or more hidden layers, output layer, any of which can be convolutional layers, dense layers, long short-term memory (LSTM) layers, non-linearity layers, pooling layers, batch normalization layers, or padding layers). As another example, the LLM can include any suitable numbers of neurons in various layers (e.g., different layers can have the same or different numbers of neurons as each other). As yet another example, the LLM can include any suitable activation functions (e.g., softmax, sigmoid, hyperbolic tangent, rectified linear unit) in various neurons (e.g., different neurons can have the same or different activation functions as each other). As still another example, the LLM can include any suitable interneuron connections or interlayer connections (e.g., forward connections, skip connections, recurrent connections).

Regardless of its specific internal architecture, the LLM can be configured as a generative text-to-text model. That is, the LLM can be configured to receive as input any suitable textual data (which, in various cases, may or may not be accompanied by any suitable numerical data or any suitable graphical data), and the LLM can be configured to produce as output synthesized textual content (e.g., one or more synthesized sentences or sentence fragments) that is semantically or substantively based on such inputted textual data (and based on accompanying numerical or graphical data, as appropriate).

In order to accomplish this, the LLM can be considered as comprising an encoding portion and a generative portion. In various aspects, the encoding portion can any suitable upstream layers of the LLM that are configured to receive the inputted textual data (and any accompanying numerical or graphical data, as appropriate) and to produce embeddings based on that inputted textual data. In various instances, the generative portion can be any suitable downstream layers of the LLM that are configured to receive those embeddings and to produce the synthesized textual content based on those embeddings.

In various aspects, an embedding produced by the encoder portion of the LLM in response to a piece of inputted textual, numerical, or graphical data can be considered as any suitable mathematical quantity (e.g., scalar, vector, matrix, tensor, or any suitable combination thereof) that numerically represents at least some substantive or semantic aspect of that inputted textual, numerical, or graphical data in a low-dimensional fashion. In other words, the embedding can be smaller in terms of size or dimensionality (e.g., in some cases, one or more orders of magnitude smaller) than such inputted textual, numerical, or graphical data; but despite such smaller size, the embedding can nevertheless be considered as substantively or semantically representing such inputted textual, numerical, or graphical data. In still other words, the embedding can be considered as a latent vector representation of such inputted textual, numerical, or graphical data.

In various aspects, the model component can electronically leverage the encoder portion of the LLM, so as to identify the particular equipment operation that the user desires the medical device to perform.

More specifically, the model component can electronically execute the LLM on the first natural language sentence. In various aspects, this can cause the LLM to produce some synthesized text that is based on the first natural language sentence. That is, the model component can feed the first natural language sentence to an input layer of the LLM, the first natural language sentence can complete a forward pass through one or more hidden layers of the LLM, and an output layer of the LLM can compute the synthesized text based on activations provided by the one or more hidden layers. Note that, during such execution, the first natural language sentence can be considered as passing through the encoder portion of the LLM, which can cause the encoder portion to produce some given embedding for the first natural language sentence, and such given embedding can then be passed through the generative portion of the LLM, thereby yielding the synthesized text. In some instances, the synthesized text can be discarded, but the model component can extract or otherwise preserve the given embedding.

Now, in various aspects, there can be a plurality of textual descriptions that respectively correspond to the plurality of available equipment operations of the medical device. In various instances, each of the plurality of textual descriptions can be one or more plain text sentences that describe or explain the functionality, purpose, or any other details of a respective one of the plurality of available equipment operations. In various cases, the model component can generate, via execution of the LLM and extraction from the encoder portion, a respective embedding for each of the plurality of textual descriptions and thus for each of the plurality of available equipment operations.

In various aspects, the model component can identify the particular equipment operation that the user desires to be performed, by comparing the given embedding of the first natural language sentence to the embeddings of the plurality of available equipment operations. In various instances, the model component can perform such comparison via any suitable error or similarity computation (e.g., mean absolute error (MAE), mean squared error (MSE), cross-entropy error, cosine similarity, Euclidean distance). In various cases, the model component can identify as the particular equipment operation whichever of the plurality of available equipment operations has an embedding that is closest or otherwise most similar to the given embedding of the first natural language sentence. Note that, because such identification is facilitated using LLM embeddings, the particular equipment operation can be identified, even if the words of the first natural language sentence are synonymous with but not identical to the words of whatever textual description corresponds to the particular equipment operation. In contrast, a technique that instead relies upon keyword searching would not be able to identify the particular equipment operation in situations where the words of the first natural language sentence are synonymous with but not identical to the words of whatever textual description corresponds to the particular equipment operation.

In any case, the model component can leverage embeddings produced by the LLM, so as to identify the particular equipment operation that the user desires to be performed by the medical device. Accordingly, the model component can electronically instruct or otherwise electronically cause the medical device to perform the particular equipment operation.

In this way, the computerized tool can be considered as leveraging embeddings produced by the encoder portion of the LLM, so as to facilitate touchless operation of the medical device.

Now, the present inventors realized that the generative portion of the LLM can also be leveraged to help improve or benefit the medical device. In particular, as mentioned above, the medical device can record, track, or capture any suitable health data pertaining to the medical patient. In various aspects, the present inventors realized that the generative portion of the LLM can be leveraged so as to assist with analysis or interpretation of such health data.

In particular, the access component can, in various embodiments, electronically access a second natural language sentence. In various aspects, the second natural language sentence can request or command identification of one or more details or analyses regarding the health of the medical patient. More specifically, the user can verbally speak such request or command, and that spoken verbalization can be audibly captured or recorded by any suitable microphone that is associated with the medical device. In various instances, the access component can electronically receive or retrieve such audio recording from the medical device, and the access component can electronically apply any suitable speech-to-text transcription tools or techniques. In various cases, such application of speech-to-text transcription can yield the second natural language sentence.

Now, in various cases, the model component of the computerized tool can electronically store, maintain, control, or otherwise access a plurality of diagnostic machine learning models. In various aspects, each of the plurality of diagnostic machine learning models can exhibit any suitable deep learning internal architecture (e.g., different diagnostic machine learning models can exhibit the same or different architectures as each other). For example, any diagnostic machine learning model can include any suitable numbers of any suitable types of layers (e.g., input layer, one or more hidden layers, output layer, any of which can be convolutional layers, dense layers, LSTM layers, non-linearity layers, pooling layers, batch normalization layers, or padding layers). As another example, any diagnostic machine learning model can include any suitable numbers of neurons in various layers (e.g., different layers can have the same or different numbers of neurons as each other). As yet another example, any diagnostic machine learning model can include any suitable activation functions (e.g., softmax, sigmoid, hyperbolic tangent, rectified linear unit) in various neurons (e.g., different neurons can have the same or different activation functions as each other). As still another example, any diagnostic machine learning model can include any suitable interneuron connections or interlayer connections (e.g., forward connections, skip connections, recurrent connections).

Regardless of their specific internal architectures, each of the plurality of diagnostic machine learning models can be configured to perform a respective medical or clinical inferencing task on inputted health data. As some non-limiting examples, some of the plurality of diagnostic machine learning models can be configured to perform medical or clinical classification on inputted health data, whereas others of the plurality of diagnostic machine learning models can be configured to perform medical or clinical segmentation on inputted health data, whereas even others of the plurality of diagnostic machine learning models can be configured to perform medical or clinical regression on inputted health data.

In various aspects, the model component can electronically leverage both the encoder portion and the generative portion of the LLM, so as to identify a natural language answer to whatever request or command is conveyed by the second natural language sentence.

More specifically, the model component can execute (e.g., sequentially or in parallel) each of the plurality of diagnostic machine learning models on the health data that is measured or captured by the medical device. In various aspects, this can yield a plurality of inferencing task results that respectively correspond to the plurality of diagnostic machine learning models. In particular, for each diagnostic machine learning model, the model component can feed the second natural language sentence to an input layer of the diagnostic machine learning model, the second natural language sentence can complete a forward pass through one or more hidden layers of the diagnostic machine learning model, and an output layer of the diagnostic machine learning model can compute a respective inferencing task result based on activations provided by the one or more hidden layers of the diagnostic machine learning model. By performing this for each of the plurality of diagnostic machine learning models, the model component can produce the plurality of inferencing task results.

Now, in various aspects, the model component can execute the LLM on the second natural language sentence in retrieval-augmented generative (RAG) fashion, using the plurality of inferencing task results as references or context. In particular, the model component can generate, via execution of the LLM and extraction from the encoder portion, a respective embedding for each of the plurality of inferencing task results. Likewise, the model component can generate, via execution of the LLM and extraction from the encoder portion, a given embedding for the second natural language sentence.

In various aspects, the model component can identify one or more inferencing task results that are relevant to the second natural language sentence, by comparing the given embedding of the second natural language sentence to the embeddings of the plurality of inferencing task results. As above, the model component can perform such comparison via any suitable error or similarity computation (e.g., MAE, MSE, cross-entropy error, cosine similarity, Euclidean distance). In various instances, whichever of the plurality of inferencing task results have embeddings that are sufficiently similar or close to the given embedding of the second natural language sentence can be considered as being substantively or semantically relevant to the second natural language sentence. These can be referred to as one or more relevant inferencing task results.

Accordingly, the model component can, in various cases, execute the LLM on both the second natural language sentence and the one or more relevant inferencing task results, and such execution can yield the natural language answer. More specifically, the model component can concatenate the second natural language sentence and the one or more relevant inferencing task results together, the model component can feed that concatenation to the input layer of the LLM, that concatenation can complete a forward pass through the one or more hidden layers of the LLM, and the output layer of the LLM can calculate the natural language answer based on activations provided by the one or more hidden layers of the LLM.

In any case, the natural language answer can be one or more plain text sentences that can be substantively or semantically responsive to the second natural language sentence (e.g., that can describe, explain, or identify whatever health or medical detail of the medical patient that was asked by or requested in the second natural language sentence). In some aspects, the model component can visually render the natural language answer on any suitable computer screen of the medical device, so that the user of the medical device can see the natural language answer. In other aspects, the model component can audibly play, via any suitable text-to-speech conversion techniques, the natural language answer on any suitable speaker of the medical device, so that the user of the medical device can hear the natural language answer.

In this way, the computerized tool can be considered as leveraging the LLM, so as to aid or improve analysis or interpretation of whatever health data is captured or measured by the medical device. In particular, the present inventors realized that, by treating the inferencing task results produced by the plurality of diagnostic machine learning models as RAG references for the LLM, a rich generative-vs-diagnostic interplay can arise. Indeed, the medical device can capture or measure health data of the medical patient, and the plurality of diagnostic machine learning models can by executed on that health data so as to yield medical results (e.g., medical classification labels, medical segmentation masks, medical regression outputs). As recognized by the present inventors, such medical results can be treated as RAG references for the LLM. Accordingly, the user of the medical device can have no need to physically or tactilely interact with the medical device so as to manually review or sift through each of those medical results. Instead, the user can verbally ask a question regarding the health of the medical patient, and the LLM can answer that question using whatever relevant information is conveyed by those medical results, even if the user's question does not explicitly recite keywords that are known to correspond to those medical results. In other words, RAG-based execution of the LLM using diagnostic machine learning results as references can enable the user of the medical device to efficiently review or explore those diagnostic machine learning results in a touchless fashion that is not lexicographically rigid or inflexible.

Note that, in order for equipment operation identification and health question answering to be facilitated accurately or reliably, the LLM and the plurality of diagnostic machine learning models should undergo training. Accordingly, the computerized tool described herein can comprise a training component that can facilitate such training in any suitable fashion (e.g., supervised fashion, unsupervised fashion, semi-supervised training, reinforcement learning fashion).

Various embodiments described herein can be employed to use hardware or software to solve problems that are highly technical in nature (e.g., to facilitate touchless operation of medical devices via large language models), that are not abstract and that cannot be performed as a set of mental acts by a human. Further, some of the processes performed can be performed by a specialized computer (e.g., large language models, diagnostic machine learning models) for carrying out defined acts related to medical devices. For example, such defined acts can include: accessing, by a processor and via a microphone associated with a medical device, a first natural language sentence spoken by a user of the medical device, wherein the first natural language sentence requests that the medical device perform an equipment operation; extracting, by the processor and from an encoder portion of an LLM, an embedding corresponding to the first natural language sentence; identifying, by the processor, the equipment operation, by comparing the embedding to a plurality of embeddings respectively corresponding to a plurality of available equipment operations of the medical device, wherein the equipment operation is identified as whichever of the plurality of available equipment operations whose embedding is most similar to the embedding of the first natural language sentence; and instructing, by the processor, the medical device to perform the equipment operation. In various cases, such defined acts can further include: accessing, by the processor and via the microphone of the medical device, a second natural language sentence spoken by the user of the medical device, wherein the second natural language sentence asks about a medical patient being monitored by the medical device; and generating, by the processor, a natural language answer for the second natural language sentence, by executing the LLM on the second natural language sentence in RAG fashion using a plurality of inferencing task results as references, wherein the plurality of inferencing task results are produced by respectively executing a plurality of artificial intelligence models on health data of the medical patient captured or recorded by the medical device. In some cases, any other suitable RAG references can be used in addition to the plurality of inferencing task results, such as any other suitable EMR data or clinical repositories which might be locally available or remotely available (e.g., via cloud computing solutions).

Such defined acts are not performed manually by humans. Indeed, neither the human mind nor a human with pen and paper can: electronically transcribe a spoken sentence into text; electronically extract an embedding of that text from hidden layers of an LLM; and electronically identify an equipment operation which that text requests or commands to be performed by a medical device, by comparing (e.g., via cosine similarity or Euclidean distance) that embedding to embeddings of textual descriptions that are known to correspond to available or possible equipment operations of the medical device. Additionally, neither the human mind nor a human with pen and paper can: electronically transcribe a spoken sentence into text; and electronically execute an LLM in RAG fashion on that text, using as RAG references whatever inferencing task results are produced by diagnostic machine learning models that are executed on health data captured by a medical device. Indeed, medical devices (e.g., CT scanners, heart rate monitors, robotically-assisted surgical machines) and deep learning neural networks (e.g., LLMs, diagnostic machine learning models) are inherently-computerized, hardware-based, or software-based constructs that simply cannot be meaningfully implemented, trained, or executed in any way by the human mind without computers. A computerized tool that can facilitate touchless operation of a medical device, or touchless exploration of inferencing results derived from health data captured by the medical device, by leveraging LLM embeddings is likewise inherently-computerized and cannot be implemented in any sensible, practical, or reasonable way without computers.

Moreover, various embodiments described herein can integrate into a practical application various teachings relating to touchless operation of medical devices via large language models. As described above, existing techniques for facilitating touchless operation of medical devices rely upon keyword searching. For instance, a user can verbally ask that a specific operation by performed by a medical device, but existing techniques cannot properly or reliably cause such performance unless the user explicitly recites whatever keywords are known to correspond to that specific operation. Similarly, the medical device can capture or measure health data of a medical patient, and multiple diagnostic models can be executed on that health data, thereby yielding multiple inferencing results. A user can verbally ask a question regarding one or more of those multiple inferencing results, but existing techniques cannot properly or reliably answer such question unless the user explicitly recites whatever keywords are known to correspond to those one or more inferencing results. Thus, existing techniques for facilitating touchless operation of medical devices can be considered as being lexicographically rigid or inflexible, which can be undesirable.

Various embodiments described herein can address one or more of these technical problems. In particular, the present inventors devised various techniques for facilitating touchless operation of medical devices via LLMs (e.g., such as ChatGPT). Specifically, the present inventors recognized that, unlike keyword searching which only captures precise word usage, LLM embeddings can be considered as capturing or quantifying substantive or semantic meaning. Accordingly, two different sentences that have synonymous semantic meanings would commensurately or correspondingly have similar or close-together LLM embeddings, notwithstanding that they have different or non-identical words. So, the present inventors devised various embodiments described herein, which can be considered as utilizing LLM embeddings to facilitate touchless operation of medical devices.

In some cases, a medical device can have multiple possible equipment operations, a user can verbally ask or command that one of those multiple possible equipment operations be performed, and various embodiments can determine which specific equipment operation that is by comparing an LLM embedding of whatever verbal sentence is spoken by the user to respective LLM embeddings known to correspond to those multiple possible equipment operations (e.g., known to correspond to textual descriptions of those multiple possible equipment operations). In this way, whatever equipment operation that the user requests or commands can be determined or identified, even if the user does not explicitly recite keywords that are known to correspond to that equipment operation.

Likewise, in some cases, a medical device can capture or measure health data of a medical patient, such health data can be analyzed by multiple different diagnostic models, a user can ask a question regarding the health of the medical patient, and various embodiments can answer that question by executing an LLM in RAG fashion using whatever inferencing task results are produced by those multiple different diagnostic models as references. In this way, the user's question can be answered, even if the user does not explicitly recite keywords that are known to correspond to those inferencing task results.

Accordingly, various embodiments described herein can be considered as a clever or inventive utilization of LLM embeddings so as to facilitate touchless operation of medical devices in a lexicographically non-rigid or flexible fashion. Thus, various embodiments described herein certainly constitute a tangible and concrete technical improvement or technical advantage in the field of medical devices. Accordingly, such embodiments clearly qualify as useful and practical applications of computers.

Furthermore, various embodiments described herein can control real-world tangible devices based on the disclosed teachings. For example, various embodiments described herein can electronically train and execute real-world deep learning neural networks, so as to touchlessly operate real-world medical devices.

It should be appreciated that the herein figures and description provide non-limiting examples of various embodiments and are not necessarily drawn to scale.

FIG. 1 illustrates a block diagram of an example, non-limiting system 100 that can facilitate touchless operation of medical devices via large language models in accordance with one or more embodiments described herein. As shown, a touchless operation system 102 can be electronically integrated, via any suitable wired or wireless electronic connection, with a medical device 104.

In various embodiments, the medical device 104 can be any suitable type of computerized medical equipment or computerized medical modality that can electronically monitor any suitable biological, clinical, or medical attribute, characteristic, or feature of a medical patient 106.

In various aspects, the medical device 104 can be any suitable computerized equipment or modality for capturing or generating medical images of the medical patient 106. As a non-limiting example, the medical device 104 can be a CT scanner that can capture or generate CT scanned pixel arrays or voxel arrays depicting any suitable anatomical structure (e.g., tissue, organ, body part, body cavity, or portion thereof) of the medical patient 106. As another non-limiting example, the medical device 104 can be an MRI scanner that can capture or generate MRI scanned pixel arrays or voxel arrays depicting any suitable anatomical structure of the medical patient 106. As even another non-limiting example, the medical device 104 can be an X-ray scanner that can capture or generate X-ray scanned pixel arrays or voxel arrays depicting any suitable anatomical structure of the medical patient 106. As yet another non-limiting example, the medical device 104 can be an ultrasound scanner that can capture or generate ultrasound scanned pixel arrays or voxel arrays depicting any suitable anatomical structure of the medical patient 106. As still another non-limiting example, the medical device 104 can be a PET scanner that can capture or generate PET scanned pixel arrays or voxel arrays depicting any suitable anatomical structure of the medical patient 106. As another non-limiting example, the medical device 104 can be an NM scanner that can capture or generate NM scanned pixel arrays or voxel arrays depicting any suitable anatomical structure of the medical patient 106. As yet another non-limiting example, the medical device 104 can be a visible-spectrum camera (e.g., endoscope, bedside camera) that can capture or generate visible spectrum photographs or video clips depicting any suitable anatomical structure of the medical patient 106.

In various instances, the medical device 104 can be any suitable computerized equipment or modality for capturing, monitoring, measuring, or otherwise tracking any suitable biological vital-sign of the medical patient 106, and such equipment or modality can be either wearable or standalone. As a non-limiting example, the medical device 104 can be a blood pressure gauge that can measure a blood pressure of the medical patient 106 over time. As another non-limiting example, the medical device 104 can be a pulse tracker that can measure a pulse rate of the medical patient 106 over time. As yet another non-limiting example, the medical device 104 can be a pulse oximeter that can measure a pulse strength (e.g., expressed as perfusion index values) of the medical patient 106 over time. As still another non-limiting example, the medical device 104 can be an electrocardiogram monitor that can measure an electrocardiogram trace showing how the cardiac muscle of the medical patient 106 is polarizing or depolarizing with respect to time. As even another non-limiting example, the medical device 104 can be a seismocardiogram monitor that can measure a seismocardiogram trace showing how the chest wall of the medical patient 106 is accelerating or decelerating with respect to time. As another non-limiting example, the medical device 104 can be a phonocardiogram monitor that can measure a phonocardiogram trace showing what noises the heart of the medical patient 106 is making with respect to time. As yet another non-limiting example, the medical device 104 can be a clinical thermometer that can measure an anatomical temperature of the medical patient 106 over time. As still another non-limiting example, the medical device 104 can be a blood glucose monitor that can measure a blood glucose level or concentration of the medical patient 106 over time. As another non-limiting example, the medical device 104 can be a pressure plate or strain gauge that can measure a weight or body mass of the medical patient 106 over time.

In various other cases, the medical device 104 can be any suitable computerized equipment or modality for providing medical treatment or life support to the medical patient 106. As some non-limiting examples, the medical device 104 can be any suitable type of: electronic respirator; breathing machine; nebulizer; dialysis machine; infusion pump; neonatal incubator or warmer; anesthesia machine; or robotically-controlled surgery machine.

In various aspects, the medical device 104 can be or comprise any suitable combination of any of the aforementioned.

In various instances, as mentioned above, the medical device 104 can electronically measure, track, record, or otherwise observe any suitable health data associated with the medical patient 106. In various cases, such data can be referred to as measured health data 110. In various aspects, the measured health data 110 can exhibit any suitable format, size, or dimensionality. For instance, the measured health data 110 can be one or more scalars, one or more vectors, one or more matrices, one or more tensors, one or more character strings, or any suitable combination thereof. In various cases, it should be appreciated that the particular format, size, or dimensionality of the measured health data 110 can depend upon the configuration, composition, or settings of the medical device 104. As a non-limiting example, suppose that the medical device 104 comprises a CT scanner. In such case, the measured health data 110 can comprise one or more CT scanned pixel arrays or voxel arrays of the medical patient 106. As another non-limiting example, suppose that the medical device 104 comprises a PET scanner. In such case, the measured health data 110 can comprise one or more PET scanned pixel arrays or voxel arrays of the medical patient 106. As yet another non-limiting example, suppose that the medical device 104 comprises a blood pressure gauge. In such case, the measured health data 110 can comprise one or more blood pressure timeseries of the medical patient 106 or one or more instantaneous or averaged blood pressure measurement of the medical patient 106. As still another non-limiting example, suppose that the medical device 104 comprises a seismocardiogram monitor. In such case, the measured health data 110 can comprise one or more seismocardiogram traces of the medical patient 106.

In any case, the medical device 104 can be associated with a plurality of available equipment operations 108. In various aspects, the plurality of available equipment operations 108 can comprise any suitable number of equipment operations. In various instances, an equipment operation can be, represent, or otherwise refer to any suitable user-configurable hardware action or user-configurable software action that can be performed, executed, conducted, implemented, or otherwise facilitated by the medical device 104 or by any suitable portion of the medical device 104. As a non-limiting example, the medical device 104 can comprise, as a constituent part, an actuatable table, bed, or seat on which the medical patient 106 can sit or lie while being monitored by the medical device 104. In such case, an available equipment operation of the medical device 104 can be or refer to a height adjustment of the actuatable table, bed, or seat (e.g., can be or refer to activating linear or rotational actuators of the medical device 104 so as to vertically raise or lower the table, bed, or seat). As another non-limiting example, the medical device 104 can comprise, as a constituent part, an actuatable gantry that can rotate, swivel, or spiral about the medical patient 106 during monitoring. In such case, an available equipment operation of the medical device 104 can be or refer to a position adjustment or speed adjustment of the actuatable gantry (e.g., can be or refer to activating linear or rotational actuators of the medical device 104 so as to alter the angular positions to which or from the actuatable gantry rotates, or so as to alter the angular velocities at which the actuatable gantry rotates). As yet another non-limiting example, the medical device 104 can comprise, as a constituent part, an actuatable ion beam or X-ray beam emitter that can produce radiation with which or by which the medical patient 106 is monitored. In such case, an available equipment operation of the medical device 104 can be or refer to a power adjustment of the actuatable ion beam or X-ray beam emitter (e.g., can be or refer to activating voltage or current electrodes so as to increase or decrease a radiation intensity of the ion beam or X-ray beam emitter). As still another non-limiting example, the medical device 104 can comprise, as a constituent part, an actuatable heater or cooler that can heat or cool the medical patient 106 or any portion of the medical device 104 during monitoring. In such case, an available equipment operation of the medical device 104 can be or refer to a temperature adjustment of the actuatable heater or cooler (e.g., can be or refer to activating heating coils, air conditioners, or heat pumps of the medical device 104 so as to alter a temperature of the medical device 104 or of the medical patient 106). As even another non-limiting example, the medical device 104 can comprise, as a constituent part, an actuatable fluid flow valve, pump, or injector that can control a working fluid of the medical device 104 or that can administer fluidic medication to the medical patient 106. In such case, an available equipment operation of the medical device 104 can be or refer to an adjustment of the actuatable fluid flow valve, pump, or injector (e.g., can be or refer to activating linear or rotational actuators of the medical device 104 so as to increase or decrease a fluid flow pressure or fluid flow velocity of the medical device 104). As another non-limiting example, the medical device 104 can comprise, as a constituent part, an actuatable end effector (e.g., laparoscopic robotic arm) that can be used to physically interact with the medical patient 106. In such case, an available equipment operation of the medical device 104 can be or refer to a position adjustment of the actuatable end effector (e.g., can be or refer to activating linear or rotational actuators of the medical device 104 so as to move the actuatable end effector through space). As still another non-limiting example, the medical device 104 can comprise, as a constituent part, an actuatable alarm sounder. In such case, an available equipment operation of the medical device 104 can be or refer to a volume adjustment of the actuatable alarm sounder (e.g., can be or refer to increasing or decreasing of an audible volume of the alarm sounder).

In any case, a user of the medical device 104 can desire to invoke, activate, or otherwise selectively configure any of the plurality of available equipment operations 108 in a touchless fashion (e.g., without physically touching or handling tactile interfaces of the medical device 104, such as keyboards, keypads, buttons, or touchscreens). As described herein, the touchless operation system 102 can facilitate such touchless operation.

In various embodiments, the touchless operation system 102 can comprise a processor 112 (e.g., computer processing unit, microprocessor) and a non-transitory computer-readable memory 114 that is operably or operatively or communicatively connected or coupled to the processor 112. The non-transitory computer-readable memory 114 can store computer-executable instructions which, upon execution by the processor 112, can cause the processor 112 or other components of the touchless operation system 102 (e.g., access component 116, model component 118) to perform one or more acts. In various embodiments, the non-transitory computer-readable memory 114 can store computer-executable components (e.g., access component 116, model component 118), and the processor 112 can execute the computer-executable components.

In various embodiments, the touchless operation system 102 can comprise an access component 116. In various aspects, the access component 116 can electronically access or otherwise electronically communicate in any suitable fashion with the medical device 104. Accordingly, the access component 116 can electronically transmit any suitable electronic data to the medical device 104, and the medical device 104 can likewise electronically transmit any suitable electronic data to the access component 116. In some instances, the access component 116 can be considered as a proxy or conduit by which other components of the touchless operation system 102 can electronically interact with the medical device 104. In any case, because the access component 116 can electronically communicate with the medical device 104, the access component 116 can electronically receive, electronically retrieve, electronically obtain, or otherwise electronically access the measured health data 110 or the plurality of available equipment operations 108.

In various embodiments, the touchless operation system 102 can comprise a model component 118. In various aspects, as described herein, the model component 118 can leverage an LLM, so as to facilitate touchless operation of the medical device 104.

Figure 2:
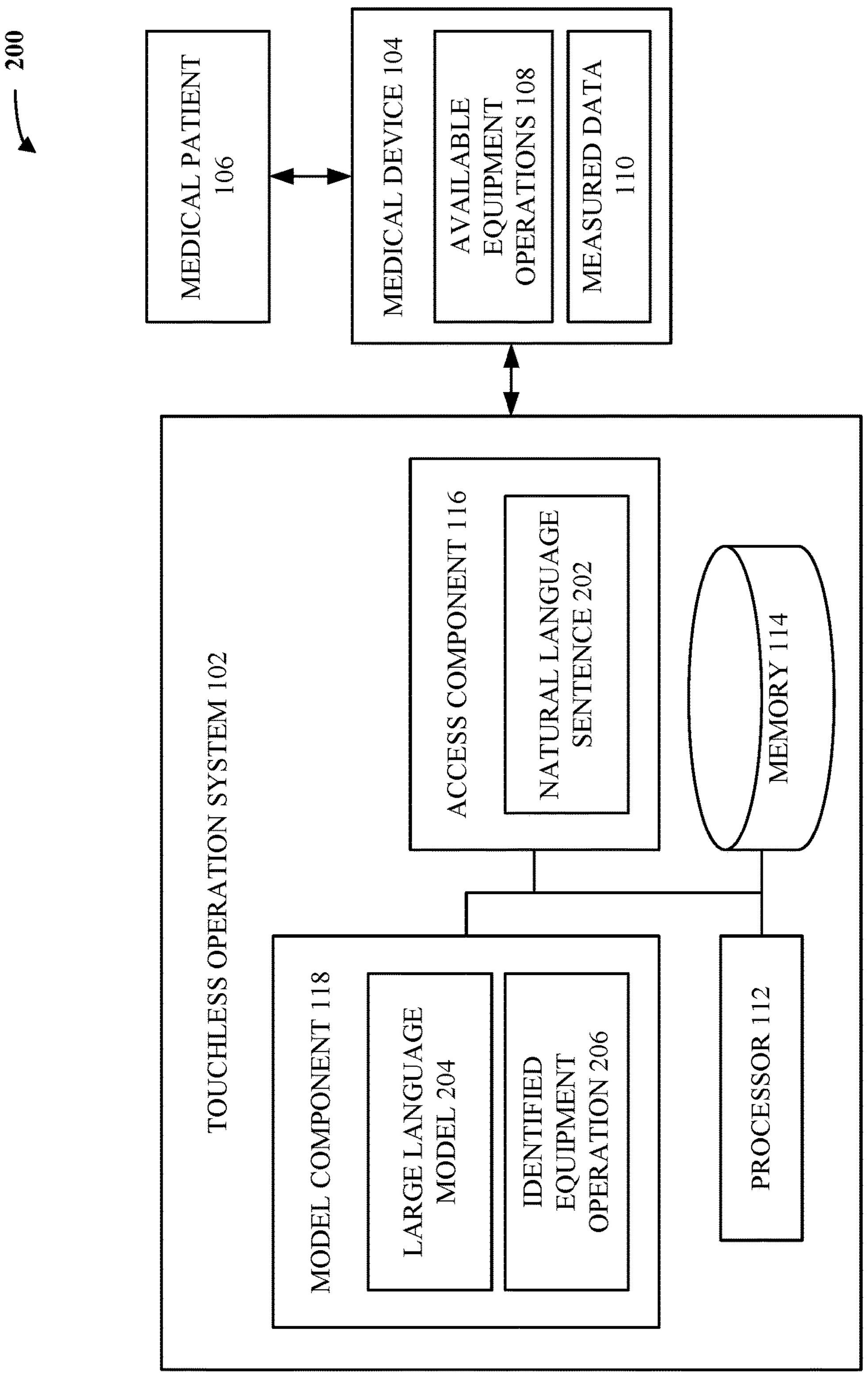
FIG. 2 illustrates a block diagram of an example, non-limiting system including a large language model that facilitates touchless operation of medical devices via large language models in accordance with one or more embodiments described herein.

FIG. 2 illustrates a block diagram of an example, non-limiting system 200 including a large language model that can facilitate touchless operation of medical devices via large language models in accordance with one or more embodiments described herein. As shown, the system 200 can, in some cases, comprise the same components as the system 100, and can further comprise a natural language sentence 202, a large language model 204 (hereafter "LLM 204"), and an identified equipment operation 206.

In various embodiments, the access component 116 can electronically access a natural language sentence 202. In various aspects, the natural language sentence 202 can be an imperative plain text sentence that requests or commands that a particular one of the plurality of available equipment operations 108 be performed, conducted, or implemented by the medical device 104. Indeed, in various instances, the user of the medical device 104 can verbally speak or vocalize such request or command, and any suitable microphone that is associated with the access component 116 (e.g., that is physically integrated into the medical device 104 and is thus accessible to the access component 116) can audibly record or capture such vocalization, thereby yielding an audio recording. In various cases, the access component 116 can apply any suitable speech-to-text transcription technique to that audio recording. Non-limiting examples of such speech-to-text transcription techniques can include: ASR based on hidden Markov models; ASR based on dynamic time warping (DTW); or ASR based on artificial neural networks. In any case, application of speech-to-text techniques to such audio recording can be considered as yielding the natural language sentence 202. In other words, the natural language sentence 202 can be considered as a string of plain text that was spoken or vocalized by the user of the medical device 104.

In various aspects, the model component 118 can electronically store, electronically maintain, electronically control, or otherwise electronically access the LLM 204. In various instances, the LLM 204 can have or otherwise exhibit any suitable deep learning internal architecture that can be configured for performing generative text-to-text synthesis. In other words, the LLM 204 can be configured to receive textual data (which can be accompanied by any suitable numerical or graphical data) as input and to produce synthesized textual data (e.g., synthesized natural language sentences or sentence fragments) as output, where such synthesized textual data is semantically or substantively based on the inputted textual data.

In various instances, the model component 118 can electronically identify which specific one of the plurality of available equipment operations 108 that the user desires to be performed by the medical device 104. For ease of explanation, such specific one of the plurality of available equipment operations 108 can be referred to as the identified equipment operation 206. In various cases, the model component 118 can facilitate such identification by analyzing the natural language sentence 202 via hidden embeddings produced by the LLM 204. Non-limiting aspects are described with respect to FIGS. 3-4.

Figure 3:
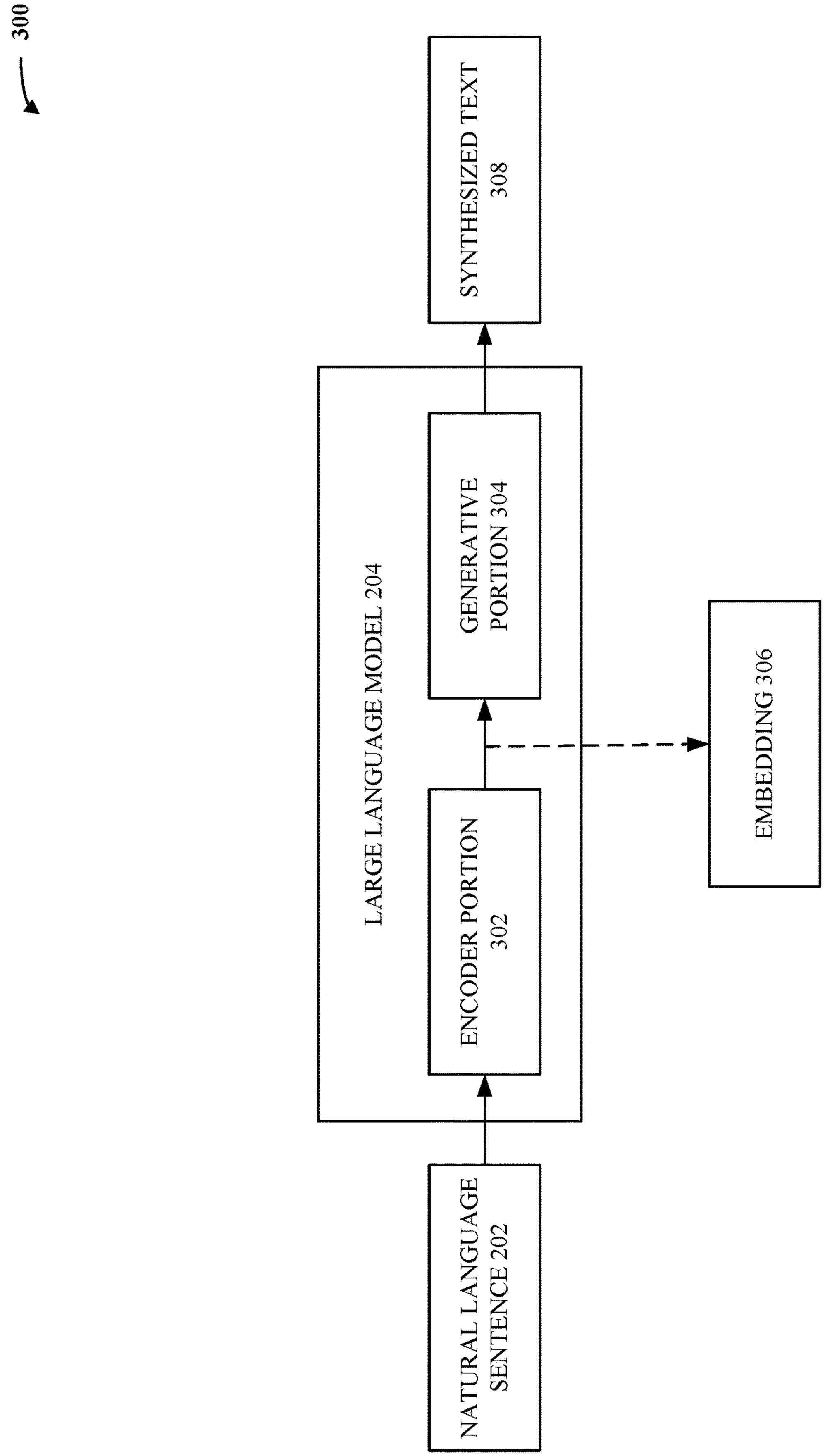
FIGS. 3-4 illustrate example, non-limiting block diagrams showing how a large language model can be leveraged to perform, in touchless fashion, equipment operations of medical devices in accordance with one or more embodiments described herein.
Figure 4:
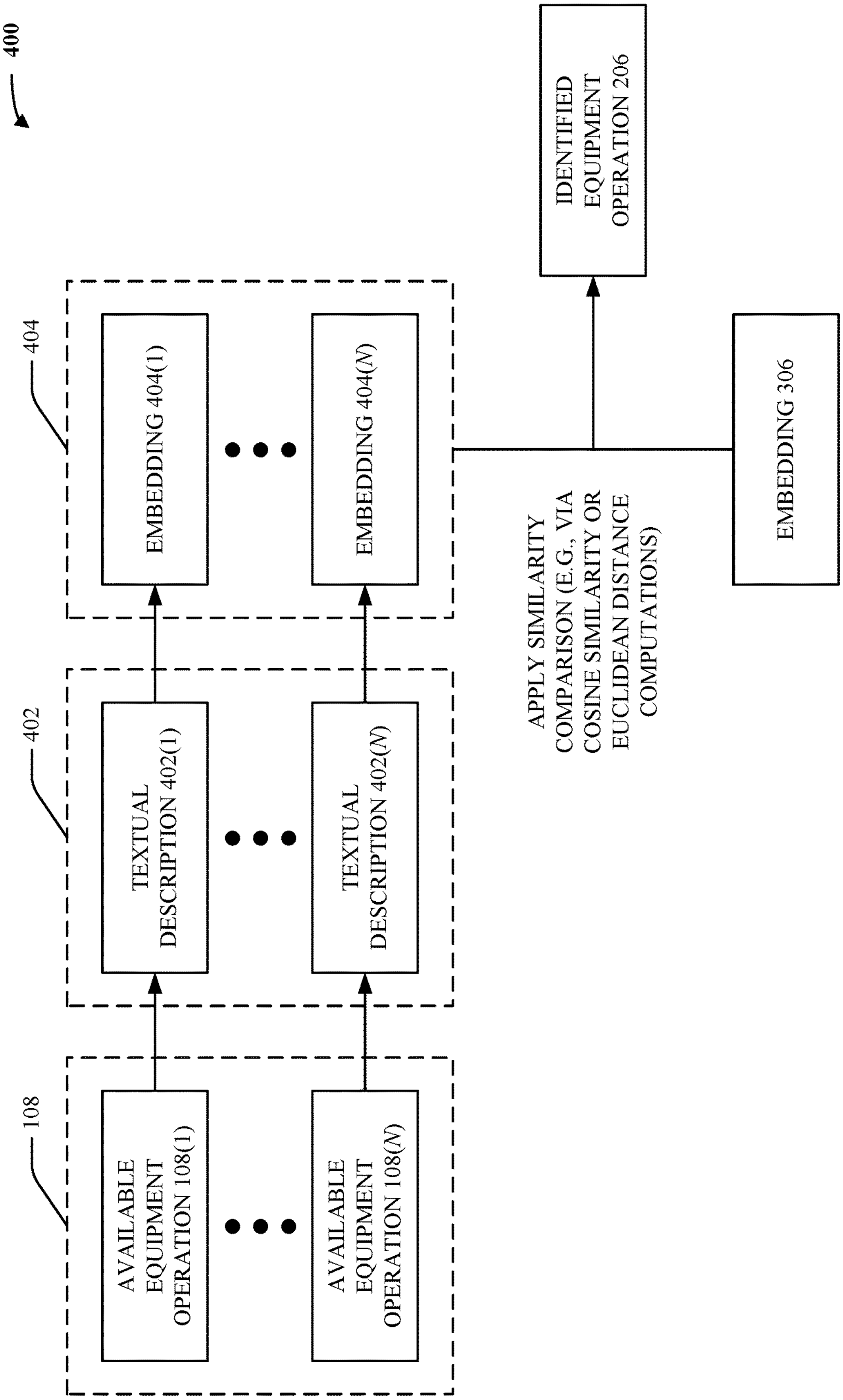

FIGS. 3-4 illustrate example, non-limiting block diagrams 300 and 400 showing how the LLM 204 can be leveraged to perform, in touchless fashion, equipment operations of the medical device 104 in accordance with one or more embodiments described herein.

First, consider FIG. 3. In various embodiments, as shown, the LLM 204 can comprise an encoder portion 302 and a generative portion 304. In various cases, the encoder portion 302 can be considered as being upstream from the generative portion 304. Equivalently, the generative portion 304 can be considered as being downstream of the encoder portion 302.

In various aspects, the encoder portion 302 can exhibit any suitable deep learning internal architecture. Indeed, in various cases, the encoder portion 302 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Likewise, in various instances, the generative portion 304 can exhibit any suitable deep learning internal architecture. Indeed, in various cases, the generative portion 304 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of the specific internal architecture (e.g., the specific numbers, types, or organizations of layers) that is implemented within the encoder portion 302, the encoder portion 302 can be configured to receive textual data (which can be accompanied by any suitable numerical or graphical data) and to produce embeddings based on such inputted textual data. In contrast, regardless of the specific internal architecture that is implemented within the generative portion 304, the generative portion 304 can be configured to receive embeddings produced by the encoder portion 302 and to produce synthesized textual content based on such embeddings.

In various aspects, the model component 118 can electronically execute the LLM 204 on the natural language sentence 202. In various instances, such execution can cause the LLM 204 to produce some synthesized text 308.

More specifically, the model component 118 can feed or route the natural language sentence 202 to an input layer of the encoder portion 302. In various cases, the natural language sentence 202 can complete a forward pass through one or more hidden layers of the encoder portion 302. In various aspects, an output layer of the encoder portion 302 can compute or otherwise calculate an embedding 306, based on activation maps or feature maps provided by the one or more hidden layers of the encoder portion 302.

In various instances, the embedding 306 can be considered as a latent vector representation that the encoder portion 302 believes or infers corresponds to the natural language sentence 202. More specifically, the embedding 306 can be one or more scalars, one or more vectors, one or more matrices, one or more tensors, or any suitable combination thereof. In various aspects, the dimensionality of the embedding 306 (e.g., the total number or cardinality of numerical elements within the embedding 306) can be smaller (e.g., many orders of magnitude smaller, in some cases) than the dimensionality of the natural language sentence 202. In various instances, despite its smaller dimensionality, the embedding 306 can nevertheless be considered as representing, albeit in hidden or non-apparent fashion, at least some substantive or semantic content of the natural language sentence 202. In other words, the embedding 306 can be considered as a compact or compressed numerical representation of the natural language sentence 202. Note that the embedding 306 can be considered as representing the natural language sentence 202 in a latent, obscure, or otherwise hidden fashion, since a third-party that has no connection or relationship to the encoder portion 302 would be unable to recreate or guess the natural language sentence 202 from the embedding 306 alone.

Now, in various aspects, the embedding 306 can be fed or routed to an input layer of the generative portion 304. In various cases, the embedding 306 can complete a forward pass through one or more hidden layers of the generative portion 304. In various aspects, an output layer of the generative portion 304 can compute or otherwise calculate the synthesized text 308, based on activation maps or feature maps provided by the one or more hidden layers of the generative portion 304.

In various aspects, the synthesized text 308 can be one or more declarative sentences or sentence fragments that the generative portion 304 has generated based on the embedding 306. Note that the synthesized text 308 can be not an estimated or approximated reconstruction of the natural language sentence 202. Instead, the synthesized text 308 can be any suitable number of synthetic sentences that somehow semantically or substantively relate to the embedding 306 and thus to the natural language sentence 202. In some cases, the synthesized text 308 can be considered as containing hallucinations that are semantically or substantively related to the natural language sentence 202.

In various aspects, the model component 118 can ignore, discard, or delete the synthesized text 308. However, the model component 118 can record, preserve, store, or otherwise maintain the embedding 306. In other words, the model component 118 can extract the embedding 306 from the encoder portion 302 (e.g., from hidden layers of the LLM 204).

Now, consider FIG. 4. In various embodiments, as shown, the plurality of available equipment operations 108 can comprise n operations, for any suitable positive integer n>1: an available equipment operation 108(1) to an available equipment operation 108(*n*). That is, the available equipment operation 108(1) can be considered as a first distinct or unique hardware-based or software-based action that is performable by the medical device 104 and that is user-configurable, user-selectable, or user-invocable; and the available equipment operation 108(*n*) can be considered as an n-th distinct or unique hardware-based or software-based action that is performable by the medical device 104 and that is user-configurable, user-selectable, or user-invocable.

In various aspects, the access component 116 can electronically receive, retrieve, obtain, or otherwise access, from any suitable electronic sources or databases, a plurality of textual descriptions 402 that can respectively correspond to the plurality of available equipment operations 108. Since the plurality of available equipment operations 108 can comprise n operations, the plurality of textual descriptions 402 can likewise comprise n descriptions: a textual description 402(1) to a textual description 402(*n*). In various instances, each of the plurality of textual descriptions 402 can be considered a brief paragraph that is known to textually explain any suitable details, features, or specifications about a respective one of the plurality of available equipment operations 108. As a non-limiting example, the textual description 402(1) can correspond to the available equipment operation 108(1). Thus, the textual description 402(1) can be one or more first declarative plain text sentences or sentence fragments that collectively explain or elaborate about the available equipment operation 108(1) (e.g., that summarize what the available equipment operation 108(1) accomplishes; that describe the purpose of the available equipment operation 108(1); that describe how the available equipment operation 108(1) is performed; that describe how the available equipment operation 108(1) can be permissively configured). As another non-limiting example, the textual description 402(*n*) can correspond to the available equipment operation 108(*n*). So, the textual description 402(*n*) can be one or more n-th declarative plain text sentences or sentence fragments that collectively explain or elaborate about the available equipment operation 108(*n*). In various cases, the plurality of textual descriptions 402 can be written or otherwise prepared by any suitable technicians or engineers associated with the medical device 104.

In various aspects, the model component 118 can electronically generate a plurality of embeddings 404, by executing the LLM 204 as described above on each of the plurality of textual descriptions 402.

As a non-limiting example, the model component 118 can execute the LLM 204 on the textual description 402(1), and the model component 118 can extract, during that execution, an embedding 404(1) from the LLM 204. More specifically, the model component 118 can feed or route the textual description 402(1) to the input layer of the encoder portion 302, the textual description 402(1) can complete a forward pass through the one or more hidden layers of the encoder portion 302, and the output layer of the encoder portion 302 can compute or otherwise calculate the embedding 404(1), based on activation maps or feature maps provided by the one or more hidden layers of the encoder portion 302. Note that the embedding 404(1) can have the same format, size, or dimensionality as the embedding 306 (e.g., an embedding can be a uniform-dimensional or uniform-size vector representing a sentence; the sentence-wise embeddings of a paragraph of sentences can be aggregated or averaged together to yield an embedding for the paragraph), and thus the embedding 404(1) can be considered as a latent vector representation of the textual description 402(1). In various cases, the embedding 404(1) can then complete a forward pass through the generative portion 304, but the model component 118 can ignore, disregard, or delete whatever synthesized textual content the generative portion 304 creates based on the embedding 404(1).

As another non-limiting example, the model component 118 can execute the LLM 204 on the textual description 402(*n*), and the model component 118 can extract, during that execution, an embedding 404(*n*) from the LLM 204. Indeed, just as described above, the model component 118 can feed or route the textual description 402(*n*) to the input layer of the encoder portion 302, the textual description 402(*n*) can complete a forward pass through the one or more hidden layers of the encoder portion 302, and the output layer of the encoder portion 302 can compute or otherwise calculate the embedding 404(*n*), based on activation maps or feature maps provided by the one or more hidden layers of the encoder portion 302. So, the embedding 404(*n*) can have the same format, size, or dimensionality as the embedding 306, and thus the embedding 404(*n*) can be considered as a latent vector representation of the textual description 402(*n*). As above, the embedding 404(*n*) can then complete a forward pass through the generative portion 304, but the model component 118 can ignore, disregard, or delete whatever synthesized textual content the generative portion 304 creates based on the embedding 404(*n*).

In various cases, the embedding 404(1) to the embedding 404(*n*) can collectively be considered as the plurality of embeddings 404.

Note that the plurality of embeddings 404 can be considered as respectively corresponding to the plurality of available equipment operations 108. As a non-limiting example, because the embedding 404(1) can be derived from or otherwise based on the textual description 402(1), and because the textual description 402(1) explains the available equipment operation 108(1), the embedding 404(1) can be considered as corresponding to the available equipment operation 108(1). As another non-limiting example, because the embedding 404(*n*) can be derived from or otherwise based on the textual description 402(*n*), and because the textual description 402(*n*) explains the available equipment operation 108(*n*), the embedding 404(*n*) can be considered as corresponding to the available equipment operation 108 (*n*).

In various aspects, the model component 118 can electronically determine the identified equipment operation 206, by comparing the embedding 306 to the plurality of embeddings 404. In particular, for each given embedding of the plurality of embeddings 404, the model component 118 can compute any suitable error or similarity value between that given embedding and the embedding 306. As some non-limiting examples, such error or similarity value can involve: MAE computation; MSE computation; cosine similarity computation; Euclidean distance computation; or cross-entropy computation. In any case, the model component 118 can conclude that the identified equipment operation 206 is whichever of the plurality of available equipment operations 108 whose embedding (e.g., one of 404) is most similar or closest to the embedding 306. Note that, due to the extraction of embeddings from the LLM 204, the model component 118 can accomplish such identification, even in situations where no keywords known to correspond to the identified equipment operation 206 are explicitly recited in the natural language sentence 202. In stark contrast, keyword-based techniques would not be able to accurately accomplish such identification in situations where no keywords known to correspond to the identified equipment operation 206 are explicitly recited in the natural language sentence 202.

In various aspects, in response to determining or uncovering the identified equipment operation 206, the model component 118 can electronically command, electronically instruct, or otherwise electronically cause the medical device 104 to perform, implement, or conduct the identified equipment operation 206. Thus, the model component 118 can be considered as facilitating touchless operation of the medical device 104 by leveraging embeddings extracted from the LLM 204.

Figure 5:
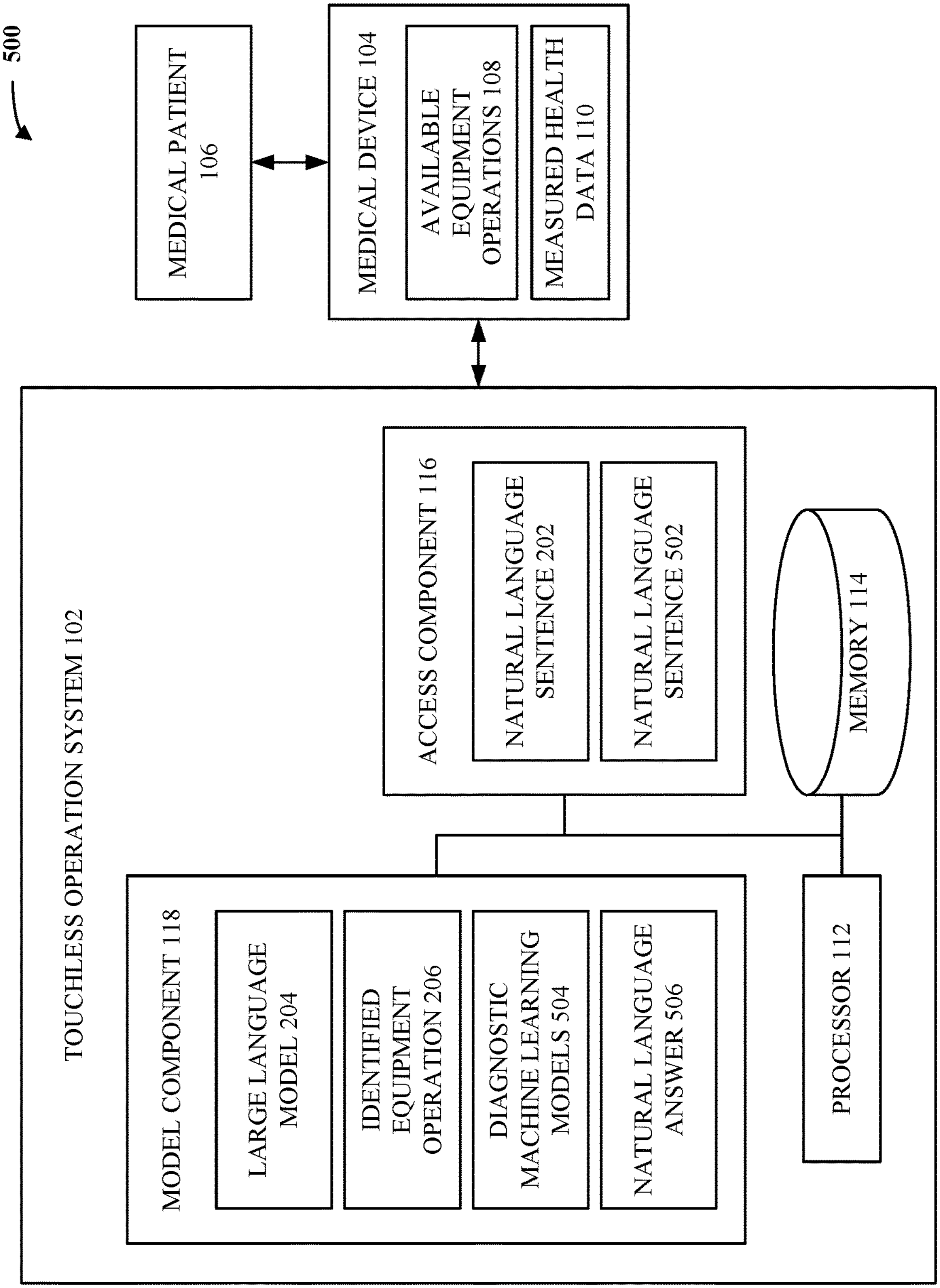
FIG. 5 illustrates a block diagram of an example, non-limiting system including a plurality of diagnostic machine learning models that facilitates touchless operation of medical devices via large language models in accordance with one or more embodiments described herein.

FIG. 5 illustrates a block diagram of an example, non-limiting system 500 including a plurality of diagnostic machine learning models that can facilitate touchless operation of medical devices via large language models in accordance with one or more embodiments described herein. As shown, the system 500 can, in some cases, comprise the same components as the system 200, and can further comprise a natural language sentence 502, a plurality of diagnostic machine learning models 504, and a natural language answer 506.

In various embodiments, the access component 116 can electronically access a natural language sentence 502. In various aspects, the natural language sentence 502 can be an interrogative plain text sentence or an imperative plain text sentence that requests or commands identification of some aspect, feature, or detail regarding the health of the medical patient 106. Indeed, in various instances, the user of the medical device 104 can verbally speak or vocalize such request or command, and whatever microphone that is associated with the access component 116 can audibly record or capture such vocalization, thereby yielding an audio recording. In various cases, the access component 116 can apply any suitable speech-to-text transcription technique (e.g., ASR based on hidden Markov models; ASR based on DTW; ASR based on artificial neural networks) to that audio recording, and such application of speech-to-text techniques can be considered as yielding the natural language sentence 502. In other words, the natural language sentence 502 can be considered as a string of plain text that was spoken or vocalized by the user of the medical device 104.

In various aspects, the model component 118 can electronically store, electronically maintain, electronically control, or otherwise electronically access the plurality of diagnostic machine learning models 504. In various instances, each of the plurality of diagnostic machine learning models 504 can have or otherwise exhibit any suitable deep learning internal architecture that can be configured for performing a respective inferencing task on recorded or captured health data. In other words, each of the plurality of diagnostic machine learning models 504 can be configured to receive health data (such as that which is capturable or recordable by the medical device 104) as input and to produce some inferencing task result (e.g., some classification label, some segmentation mask, some regression) as output based on that inputted health data.

In various instances, the model component 118 can electronically generate the natural language answer 506 in response to the natural language sentence 502, by leveraging both the LLM 204 and the plurality of diagnostic machine learning models 504. Non-limiting aspects are described with respect to FIGS. 6-8.

Figure 6:
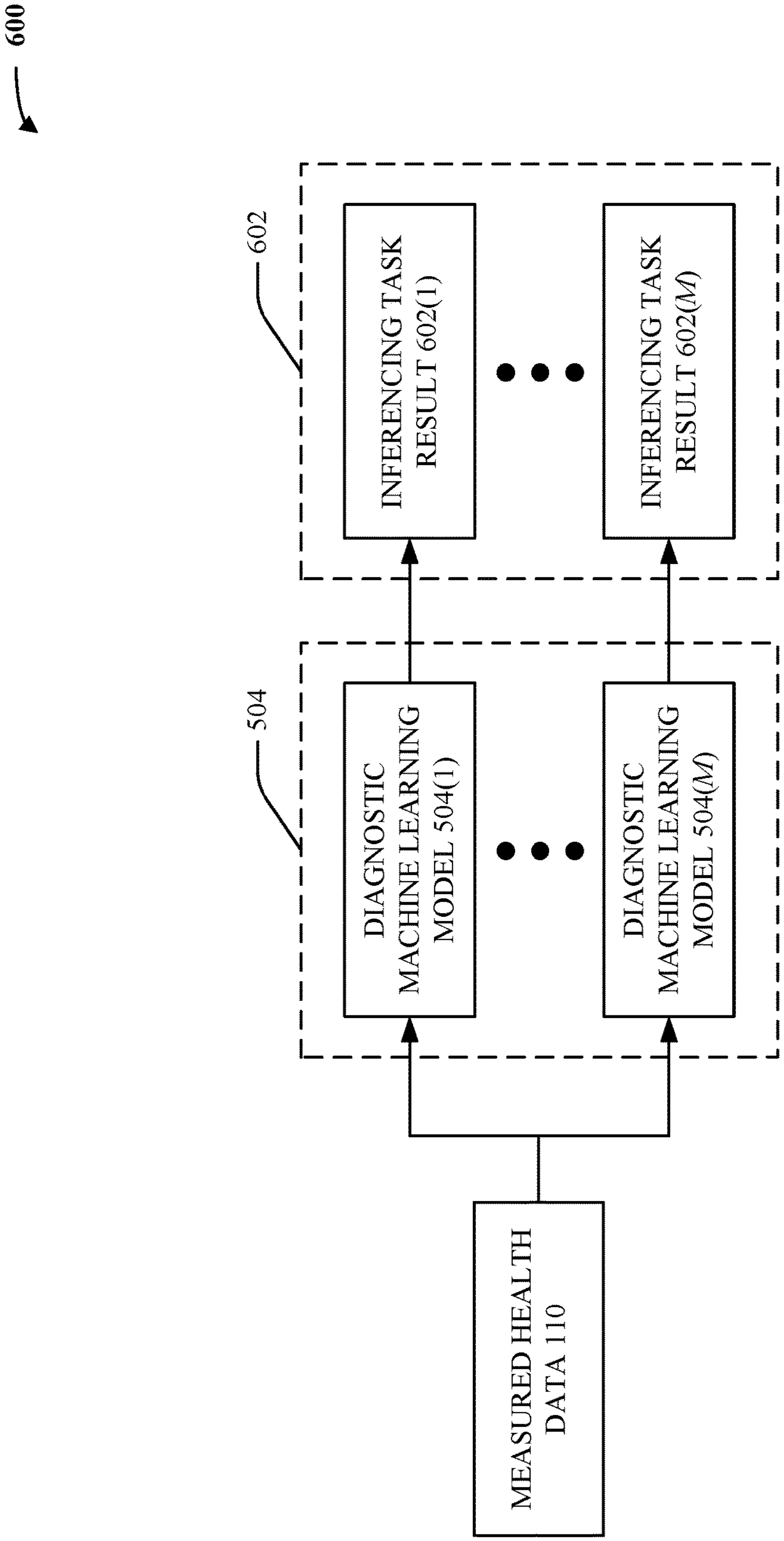
FIGS. 6-8 illustrate example, non-limiting block diagrams showing how a large language model can be leveraged to answer, in touchless fashion, questions regarding patients that are monitored by medical devices in accordance with one or more embodiments described herein.
Figure 7:
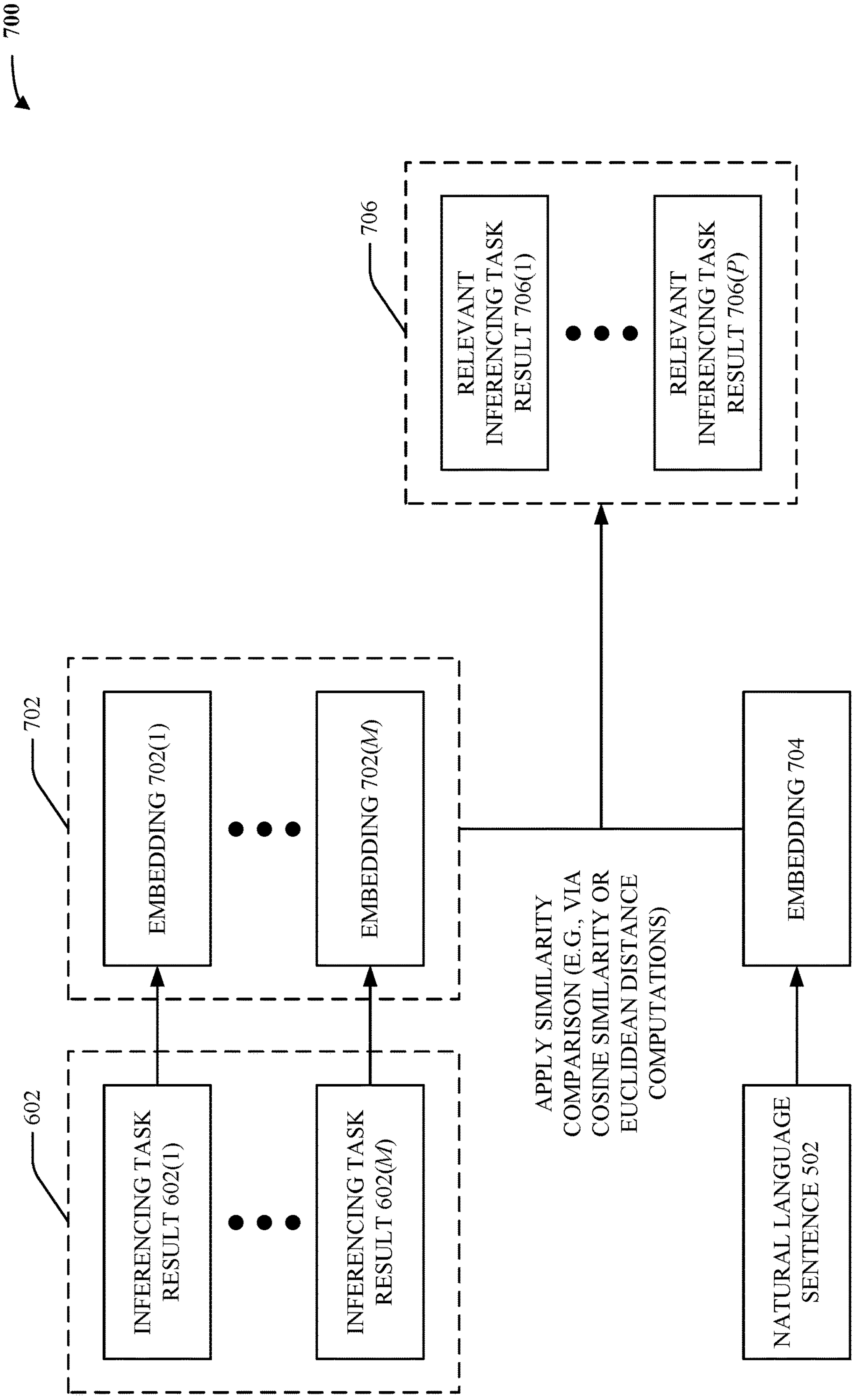
Figure 8:
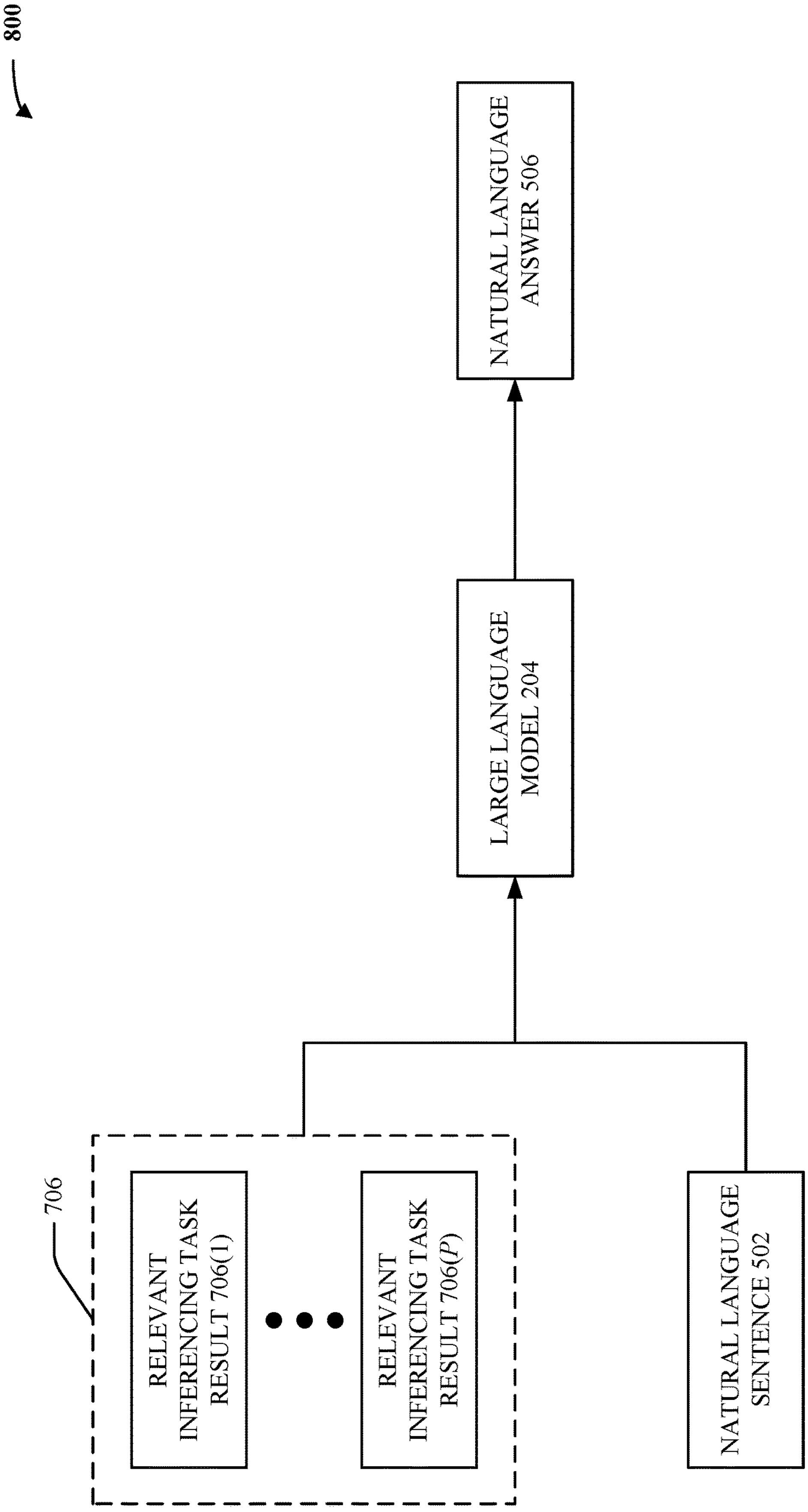

FIGS. 6-8 illustrate example, non-limiting block diagrams 600, 700, and 800 showing how the LLM 204 can be leveraged to answer, in touchless fashion, questions regarding patients that are monitored by the medical device 104 in accordance with one or more embodiments described herein.

First, consider FIG. 6. In various embodiments, as shown, the plurality of diagnostic machine learning models 504 can comprise m models, for any suitable positive integer $m>1$: a diagnostic machine learning model 504(1) to a diagnostic machine learning model 504(*m*). In various aspects, any of the plurality of diagnostic machine learning models 504 can exhibit any suitable deep learning internal architecture. Indeed, in various cases, any given diagnostic machine learning model can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of their specific internal architectures, each of the plurality of diagnostic machine learning models 504 can be configured to perform a respective medical or clinical inferencing task on inputted health data. For instance, the diagnostic machine learning model 504(1) can be configured to perform a first medical or clinical inferencing task on inputted health data, whereas the diagnostic machine learning model 504(*m*) can be configured to perform an m-th medical or clinical inferencing task on inputted health data. As a non-limiting example, a medical or clinical inferencing task can be health data classification. That is, such inferencing task can be the computation of a classification label for inputted health data, where that classification label indicates which one of two or more defined classes (e.g., diseased versus non-diseased classes; non-fractured versus mildly fractured versus severely fractured classes) to which the inputted health data belongs. As another non-limiting example, a medical or clinical inferencing task can be health data segmentation. That is, such inferencing task can be the computation of a segmentation mask for inputted health data, where that segmentation mask indicates, for each portion or part of the inputted health data, which one of two or more defined classes to which that portion or part belongs. As even another non-limiting example, a medical or clinical inferencing task can be health data regression. That is, such inferencing task can be the computation of a regression quantity (e.g., a continuously variable scalar, vector, matrix, tensor, or any suitable combination thereof) for inputted health data, where that regression quantity can represent any suitable type of medically-pertinent information (e.g., denoising or resolution enhancement; forecasted time until metastasis) for that inputted health data.

In various aspects, the model component 118 can execute each of the plurality of diagnostic machine learning models 504 on the measured health data 110 that is captured by the medical device 104. In various cases, such execution can yield a plurality of inferencing task results 602.

For instance, the model component 118 can execute the diagnostic machine learning model 504(1) on the measured health data 110, thereby yielding an inferencing task result 602(1). More specifically, the model component 118 can feed or route the measured health data 110 to an input layer of the diagnostic machine learning model 504(1), the measured health data 110 can complete a forward pass through one or more hidden layers of the diagnostic machine learning model 504(1), and an output layer of the diagnostic machine learning model 504(1) can compute or otherwise calculate the inferencing task result 602(1) based on activation maps or feature maps provided by the one or more hidden layers of the diagnostic machine learning model 504(1). Note that the inferencing task result 602(1) can be any suitable electronic data whose format, size, or dimensionality can depend upon the inferencing task that the diagnostic machine learning model 504(1) is configured or trained to perform. As a non-limiting example, suppose that such inferencing task is classification. In such case, the inferencing task result 602(1) can be a classification label that the diagnostic machine learning model 504(1) believes or infers corresponds to the measured health data 110. As another non-limiting example, suppose that such inferencing task is segmentation. In such case, the inferencing task result 602(1) can be a segmentation mask that the diagnostic machine learning model 504(1) believes or infers corresponds to the measured health data 110. As yet another non-limiting example, suppose that such inferencing task is regression. In such case, the inferencing task result 602(1) can be a regression output (e.g., one or more continuously variable scalars, vectors, matrices, or tensors) that the diagnostic machine learning model 504(1) believes or infers corresponds to the measured health data 110.

As another instance, the model component 118 can execute the diagnostic machine learning model 504(*m*) on the measured health data 110, thereby yielding an inferencing task result 602(*m*). In particular, the model component 118 can feed or route the measured health data 110 to an input layer of the diagnostic machine learning model 504 (*m*), the measured health data 110 can complete a forward pass through one or more hidden layers of the diagnostic machine learning model 504(*m*), and an output layer of the diagnostic machine learning model 504(*m*) can compute or otherwise calculate the inferencing task result 602(*m*) based on activation maps or feature maps provided by the one or more hidden layers of the diagnostic machine learning model 504(*m*). As above, the inferencing task result 602(*m*) can be any suitable electronic data whose format, size, or dimensionality can depend upon the inferencing task that the diagnostic machine learning model 504(*m*) is configured or trained to perform (e.g., can be a predicted or inferred classification label, a predicted or inferred segmentation mask, or a predicted or inferred regression output).

In various cases, the inferencing task result 602(1) to the inferencing task result 602(*m*) can collectively be considered as forming the plurality of inferencing task results 602. In various instances, the plurality of inferencing task results 602 can be considered as being various distinct or unique analytical outputs that have some diagnostic, prognostic, or otherwise clinical relevance with respect to the measured health data 110 and thus with respect to the medical patient 106.

Now, consider FIG. 7. In various embodiments, the model component 118 can electronically generate a plurality of embeddings 702, by executing the LLM 204 as described above on each of the plurality of inferencing task results 602.

As a non-limiting example, the model component 118 can execute the LLM 204 on the inferencing task result 602(1), and the model component 118 can extract, during that execution, an embedding 702(1) from the LLM 204. More specifically, the model component 118 can feed or route the inferencing task result 602(1) to the input layer of the encoder portion 302, the inferencing task result 602(1) can complete a forward pass through the one or more hidden layers of the encoder portion 302, and the output layer of the encoder portion 302 can compute or otherwise calculate the embedding 702(1), based on activation maps or feature maps provided by the one or more hidden layers of the encoder portion 302. Note that the embedding 702(1) can have the same format, size, or dimensionality as the embedding 306, and thus the embedding 702(1) can be considered as a latent vector representation of the inferencing task result 602(1). In various cases, the embedding 702(1) can then complete a forward pass through the generative portion 304, but the model component 118 can ignore, disregard, or delete whatever synthesized textual content the generative portion 304 creates based on the embedding 702(1).

As another non-limiting example, the model component 118 can execute the LLM 204 on the inferencing task result 602(*m*), and the model component 118 can extract, during that execution, an embedding 702(*m*) from the LLM 204. More specifically, the model component 118 can feed or route the inferencing task result 602(*m*) to the input layer of the encoder portion 302, the inferencing task result 602(*m*) can complete a forward pass through the one or more hidden layers of the encoder portion 302, and the output layer of the encoder portion 302 can compute or otherwise calculate the embedding 702(*m*), based on activation maps or feature maps provided by the one or more hidden layers of the encoder portion 302. Note that the embedding 702(*m*) can have the same format, size, or dimensionality as the embedding 306, and thus the embedding 702(*m*) can be considered as a latent vector representation of the inferencing task result 602(*m*). In various cases, the embedding 702(*m*) can then complete a forward pass through the generative portion 304, but the model component 118 can ignore, disregard, or delete whatever synthesized textual content the generative portion 304 creates based on the embedding 702(*m*).

In various cases, the embedding 702(1) to the embedding 702(*m*) can collectively be considered as the plurality of embeddings 702.

In similar fashion, the model component 118 can execute the LLM 204 on the natural language sentence 502, and the model component 118 can extract, during that execution, an embedding 704 from the LLM 204. In particular, the model component 118 can feed or route the natural language sentence 502 to the input layer of the encoder portion 302, the natural language sentence 502 can complete a forward pass through the one or more hidden layers of the encoder portion 302, and the output layer of the encoder portion 302 can compute or otherwise calculate the embedding 704, based on activation maps or feature maps provided by the one or more hidden layers of the encoder portion 302. Note that the embedding 704 can have the same format, size, or dimensionality as the embedding 306, and thus the embedding 704 can be considered as a latent vector representation of the natural language sentence 502. In various cases, the embedding 704 can then complete a forward pass through the generative portion 304, but the model component 118 can ignore, disregard, or delete whatever synthesized textual content the generative portion 304 creates based on the embedding 704.

In various aspects, the model component 118 can electronically identify one or more of the plurality of inferencing task results 602 that are substantively or semantically relevant to the natural language sentence 502, by comparing the embedding 704 to the plurality of embeddings 702. In particular, for each given embedding of the plurality of embeddings 702, the model component 118 can compute any suitable error or similarity value (e.g., MAE, MSE, cross-entropy, cosine similarity, Euclidean distance) between that given embedding and the embedding 704. In various cases, the model component 118 can conclude that whichever one or more of the plurality of inferencing task results 602 have embeddings that are sufficiently close or similar to the embedding 704 are substantively or semantically relevant to the natural language sentence 502. In various aspects, those identified inferencing task results can be referred to as one or more relevant inferencing task results 706. In various instances, as shown, the one or more relevant inferencing task results 706 can comprise p results, for any suitable positive integer $p<m$: a relevant inferencing task result 706(1) to a relevant inferencing task result 706(*p*). In some cases, the one or more relevant inferencing task results 706 can be whichever of the plurality of inferencing task results 602 whose embeddings are within any suitable threshold level of similarity to the embedding 704. In other cases, the model component 118 can rank the plurality of inferencing task results 602 in order of embedding similarity to the embedding 704, and the one or more relevant inferencing task results 706 can be the top p inferencing task results in such ranking.

To help clarify the concept of an inferencing task result being substantively or semantically relevant to the natural language sentence 502, consider the following non-limiting example. Suppose that the natural language sentence 502 asks, "Is the patient comfortable?". In such case, inferencing task results produced by a diagnostic machine learning model that is configured to detect, classify, or otherwise infer patient crying or wincing can be considered as being substantively or semantically relevant to the natural language sentence 502. Indeed, crying or wincing can be considered as behaviors that are pertinent to assessing patient comfort (e.g., patients that are crying or wincing are likely not comfortable). Similarly, inferencing task results produced by a diagnostic machine learning model that is configured to detect, classify, or otherwise infer patient hyperventilating or patient sweating can be considered as being substantively or semantically relevant to the natural language sentence 502. Indeed, hyperventilating or sweating can be considered as behaviors that are pertinent to assessing patient comfort (e.g., patients that are hyperventilating or sweating are likely not comfortable). In contrast, inferencing task results produced by a diagnostic machine learning model that is instead configured to detect tumors can be considered as being substantively or semantically irrelevant to the natural language sentence 502. After all, although tumor localization or detection can be significant for promoting the overall health of the patient, the precise location or detection of a tumor does not bear heavily on the patient's momentary comfort or discomfort (e.g., a patient with a tumor can nevertheless be comfortable).

In any case, the model component 118 can identify the one or more relevant inferencing task results 706, by extracting embeddings from the LLM 204.

Now, consider FIG. 8. In various embodiments, the model component 118 can electronically execute the LLM 204 on both the natural language sentence 502 and the one or more relevant inferencing task results 706. In various aspects, such execution can yield the natural language answer 506. More specifically, the model component 118 can concatenate the natural language sentence 502 and the one or more relevant inferencing task results 706 together, thereby yielding a concatenation. In various instances, that concatenation can complete respective forward passes through the encoder portion 302 and the generative portion 304. In various cases, this can cause the generative portion 304 to compute or otherwise calculate the natural language answer 506.

In various aspects, the natural language answer 506 can be one or more plain text declarative sentences that substantively or semantically respond to whatever health-related question is asked in the natural language sentence 502. In other words, the natural language sentence 502 can be considered as asking some medical or clinical question about the health of the medical patient 106, the one or more relevant inferencing task results 706 can be considered as conveying information that is related to or otherwise helpful in answering such question (e.g., indeed, the one or more relevant inferencing task results 706 are derived from the measured health data 110), and the natural language answer 506 can be considered as a succinct plain text response to that question that is synthesized based on the information conveyed by the one or more relevant inferencing task results 706.

As a non-limiting example, suppose again that the natural language sentence 502 asks, "Is the patient comfortable?", and suppose that the one or more relevant inferencing task results 706 include a wincing classification label and hyperventilating classification label. In some cases, it is possible that the crying classification label indicates that the medical patient 106 is not currently crying and that the hyperventilating classification label indicates that the medical patient 106 is not currently hyperventilating. In such cases, the natural language answer 506 can state, "The patient seems to be comfortable, since they are neither crying nor hyperventilating." In other cases, it is possible that the crying classification label indicates that the medical patient 106 is currently crying. In such cases, the natural language answer 506 can state, "The patient seems to be moderately uncomfortable, since they are crying." In even other cases, it is possible that the hyperventilating classification label indicates that the medical patient 106 is currently hyperventilating. In such cases, the natural language answer 506 can state, "The patient seems to be moderately uncomfortable, since they are hyperventilating." In yet other cases, it is possible that the crying classification label indicates that the medical patient 106 is currently crying and that the hyperventilating classification label indicates that the medical patient 106 is currently hyperventilating. In such cases, the natural language answer 506 can state, "The patient seems to be severely uncomfortable, since they are both crying and hyperventilating."

Note that, in various cases, execution of the LLM 204 as shown and described with respect to FIGS. 7-8 can be considered as being performed in RAG-fashion using the plurality of inferencing task results 602 as references or context. In various aspects, utilizing the plurality of inferencing task results 602 as RAG references or context can be considered as giving rise to a rich generative-diagnostic interplay in which the plurality of diagnostic machine learning models 504 can be considered as aiding text synthesis of the LLM 204.

In various aspects, the model component 118 can perform or initiate any suitable electronic actions based on the natural language answer 506. As a non-limiting example, the model component 118 can visually render the natural language answer 506 on any suitable electronic display (e.g., computer screen) of the medical device 104. As another non-limiting example, the model component 118 can audibly play the natural language answer 506 on any suitable electronic speaker of the medical device 104. Note that such audible playing can be accomplished via any suitable text-to-speech techniques, such as: unit selection speech synthesis; diphone speech synthesis; formant speech synthesis; articulatory speech synthesis; hidden Markov model speech synthesis; sinewave speech synthesis; or neural network speech synthesis.

In some cases, when given any natural language sentence, it can be initially unknown whether that natural language sentence requests or commands performance of one of the plurality of available equipment operations 108, or whether such natural language sentence instead requests or commands identification of some health-related information regarding the medical patient 106. In various aspects, the model component 118 can determine which situation arises, by first comparing an LLM embedding of that natural language sentence to the plurality of the embeddings 404. If any of the plurality of embeddings 404 is within any suitable threshold level of similarity to the embedding of that given natural language sentence, then it can be concluded or determined that the given natural language sentence requests or commands performance of one of the plurality of available equipment operations 108. In contrast, if none of the plurality of embeddings 404 is within any suitable threshold level of similarity to the embedding of that given natural language sentence, then it can be concluded or determined that the given natural language sentence requests or commands identification of some health-related information regarding the medical patient 106. After making such determination, the model component 118 can proceed with touchless operation as described above (e.g., if it is concluded or determined that the given natural language sentence requests or commands performance of one of the plurality of available equipment operations 108, the model component 118 can proceed as described with respect to FIGS. 2-4; if it is instead concluded or determined that the given natural language sentence requests or commands identification of some health-related information regarding the medical patient 106, the model component 118 can proceed as described with respect to FIGS. 5-8).

Figure 9:
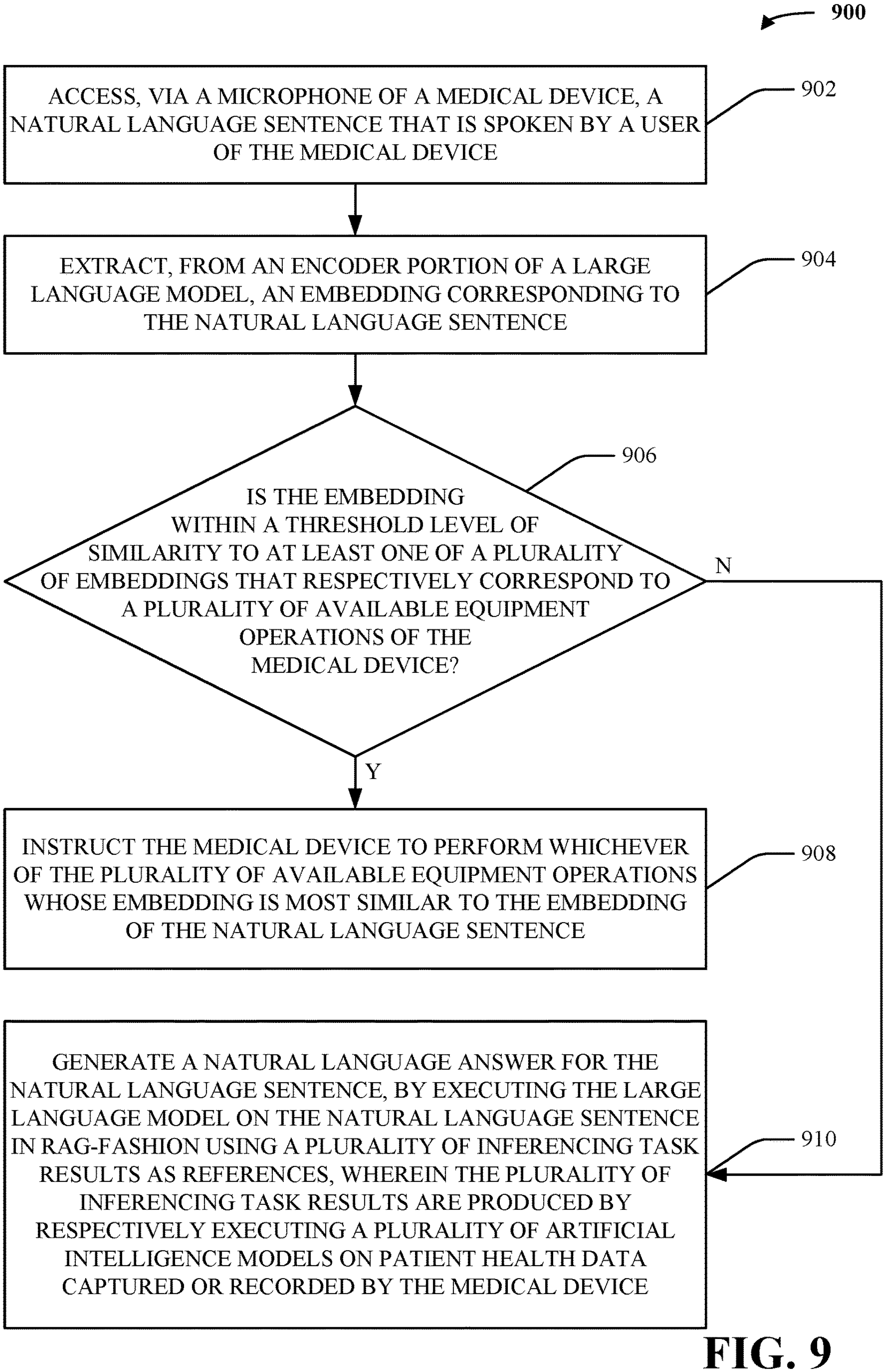
FIG. 9 illustrates a flow diagram of an example, non-limiting computer-implemented method that facilitates touchless operation of medical devices via large language models in accordance with one or more embodiments described herein.

FIG. 9 illustrates a flow diagram of an example, non-limiting computer-implemented method 900 that can facilitate touchless operation of medical devices via large language models in accordance with one or more embodiments described herein. In various cases, the touchless operation system 102 can facilitate the computer-implemented method 900.

In various embodiments, act 902 can include accessing, by a device (e.g., via 116) operatively coupled to a processor (e.g., 112) and via a microphone of a medical device (e.g., 104), a natural language sentence (e.g., 202 or 502) that is spoken by a user of the medical device.

In various aspects, act 904 can include extracting, by the device (e.g., via 118) and from an encoder portion (e.g., 302) of a large language model (e.g., 204), an embedding (e.g., 306 or 704) corresponding to the natural language sentence.

In various instances, act 906 can include determining, by the device (e.g., via 118), whether the embedding is within a threshold level of similarity to at least one of a plurality of embeddings (e.g., 404) that respectively correspond to a plurality of available equipment operations (e.g., 108) of the medical device. If so, the computer-implemented method 900 can proceed to act 908. If not, the computer-implemented method 900 can instead proceed to act 910.

In various cases, act 908 can include instructing, by the device (e.g., via 118), the medical device to perform whichever of the plurality of available equipment operations whose embedding is most similar to the embedding of the natural language sentence (e.g., instruct to perform 206).

In various aspects, act 910 can include generating, by the device (e.g., via 118), a natural language answer (e.g., 506) for the natural language sentence, by executing the large language model on the natural language sentence in RAG-fashion using a plurality of inferencing task results (e.g., 602) as references. In various cases, the plurality of inferencing task results can be produced by respectively executing a plurality of artificial intelligence models (e.g., 504) on patient health data (e.g., 110) captured or recorded by the medical device.

Figure 10:
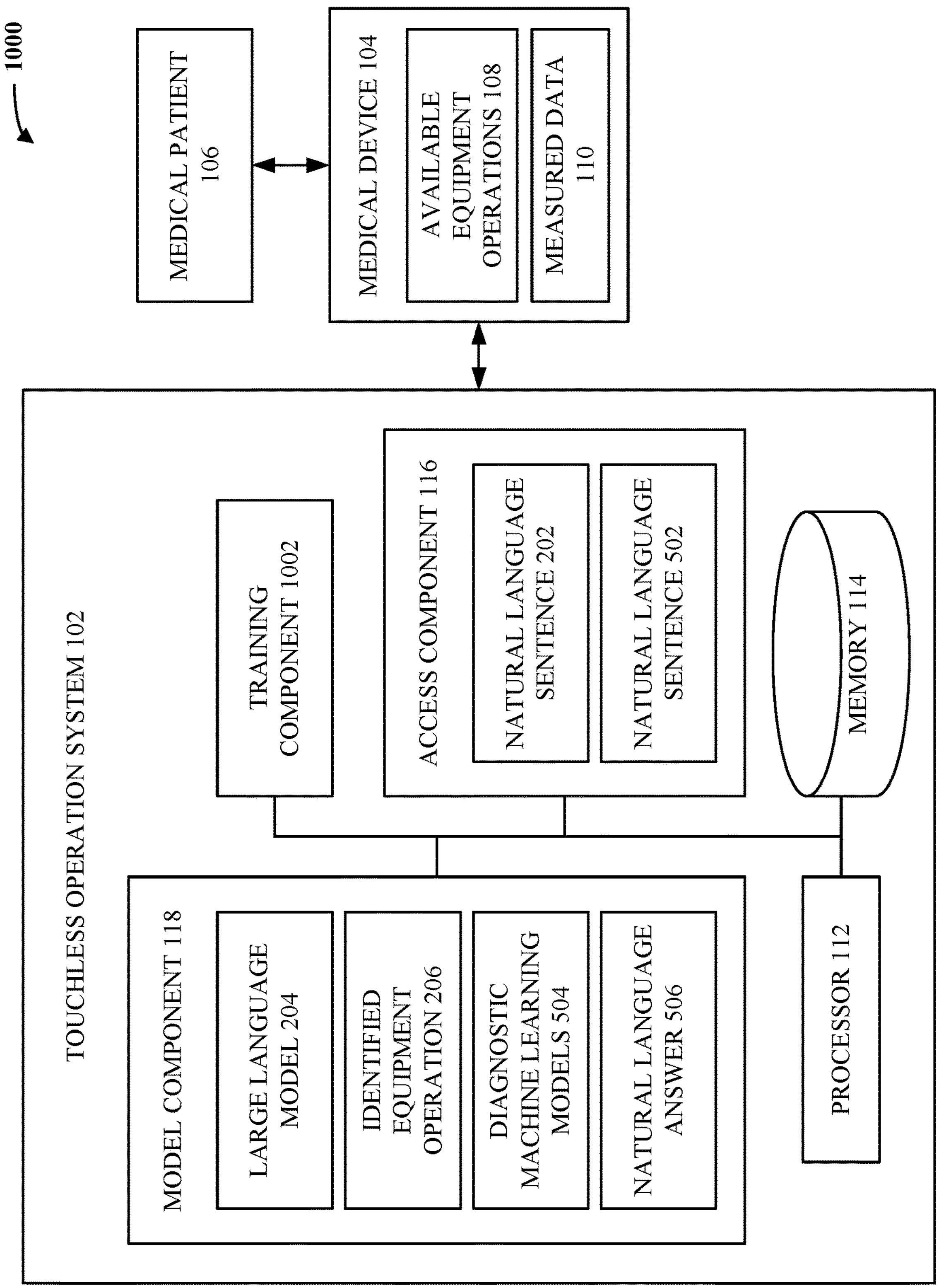
FIG. 10 illustrates a block diagram of an example, non-limiting system including a training component that facilitates touchless operation of medical devices via large language models in accordance with one or more embodiments described herein.
Figure 11:
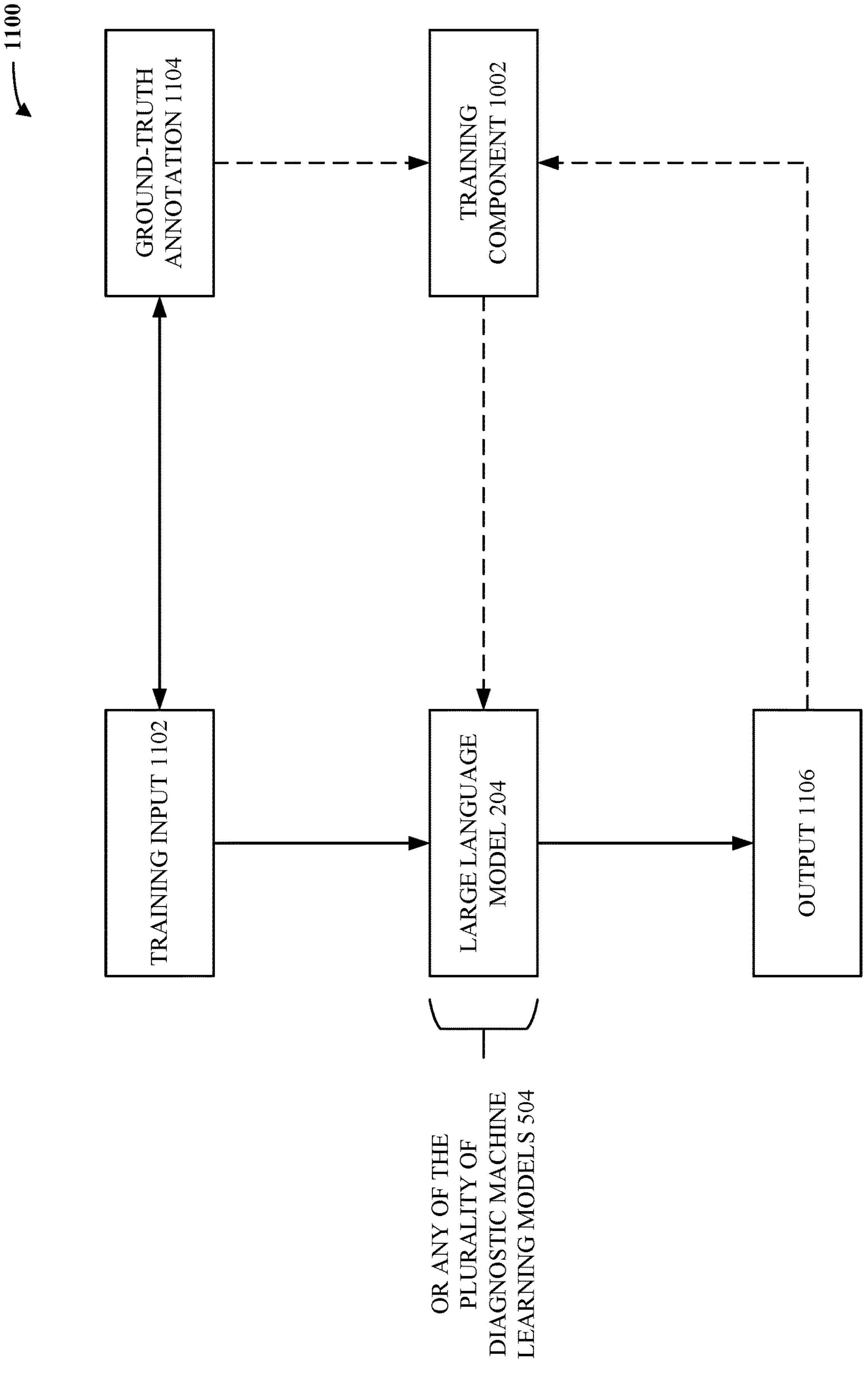
FIG. 11 illustrates an example, non-limiting block diagram showing how machine learning models can be trained in accordance with one or more embodiments described herein.

In order for the touchless operation system 102 to function accurately, correctly, or reliably, the LLM 204 and the plurality of diagnostic machine learning models 504 can first undergo training, as described with respect to FIGS. 10-11.

FIG. 10 illustrates a block diagram of an example, non-limiting system 1000 including a training component that can facilitate touchless operation of medical devices via large language models in accordance with one or more embodiments described herein. As shown, the system 1000 can, in some cases, comprise the same components as the system 500, and can further comprise a training component 1002. In various instances, the training component 1002 can train the LLM 204 or the plurality of diagnostic machine learning models 504 using any suitable training paradigm. In some cases, such training can be facilitated in supervised fashion, as described with respect to FIG. 11.

FIG. 11 illustrates an example, non-limiting block diagram 1100 showing how machine learning models can be trained in accordance with one or more embodiments described herein.

In various aspects, prior to beginning training, the training component 1002 can initialize in any suitable fashion (e.g., via random initialization) trainable internal parameters (e.g., convolutional kernels, weight matrices, bias values) of the LLM 204 (or of any of the plurality of diagnostic machine learning models 504).

In various embodiments, there can be a training input 1102 and a ground-truth annotation 1104. When it is desired to train the LLM 204, the training input 1102 can be any suitable number of training natural language sentences (which can be concatenated with any suitable training numerical data or training graphical data), and the ground-truth annotation 1104 can be correct or accurate synthesized textual content that is known or deemed to correspond to the training input 1102. Instead, when it is desired to train any of the plurality of diagnostic machine learning models 504, the training input 1102 can be training health data, and the ground-truth annotation 1104 can be a correct or accurate inferencing task result (e.g., classification label, segmentation mask, regression output) that is known or deemed to correspond to the training input 1102.

In any case, the training component 1002 can execute the LLM 204 (or any of the plurality of diagnostic machine learning models 504) on the training input 1102, thereby causing the LLM 204 (or any of the plurality of diagnostic machine learning models 504) to produce an output 1106. More specifically, in some cases, the training component 1002 can feed or route the training input 1102 to the input layer of the LLM 204 (or any of the plurality of diagnostic machine learning models 504), the training input 1102 can complete a forward pass through the one or more hidden layers of the LLM 204 (or any of the plurality of diagnostic machine learning models 504), and the output layer of the LLM 204 (or any of the plurality of diagnostic machine learning models 504) can compute the output 1106 based on activation maps or feature maps provided by the one or more hidden layers of the LLM 204 (or any of the plurality of diagnostic machine learning models 504).

Note that the format, size, or dimensionality of the output 1106 can be dictated by the number, arrangement, sizes, or other characteristics of the neurons, convolutional kernels, or other internal parameters of the output layer or of any other layers of the LLM 204 (or any of the plurality of diagnostic machine learning models 504). Accordingly, the output 1106 can be forced to have any desired format, size, or dimensionality, by adding, removing, or otherwise adjusting characteristics of the output layer or of any other layers of the LLM 204 (or any of the plurality of diagnostic machine learning models 504).

In various aspects, if the output 1106 is produced by the LLM 204, the output 1106 can be considered as the predicted or inferred textual content that the LLM 204 has synthesized based on the training input 1102. On the other hand, if the output 1106 is produced by any of the plurality of diagnostic machine learning models 504, the output 1106 can be considered as whatever predicted or inferred inferencing task result that that diagnostic machine learning model believes should correspond to the training input 1102. In any case, the ground-truth annotation 1104 can be considered as whatever correct or accurate output (e.g., correct or accurate synthesized textual content, correct or accurate inferencing task result) that is known or deemed to correspond to the training input 1102. Note that, if the LLM 204 (or any of the plurality of diagnostic machine learning models 504) has so far undergone no or little training, then the output 1106 can be highly inaccurate. In other words, the output 1106 can be very different from the ground-truth annotation 1104.

In various aspects, the training component 1002 can compute an error (e.g., MAE, MSE, cross-entropy error) between the output 1106 and the ground-truth annotation 1104. In various instances, the training component 1002 can incrementally update the trainable internal parameters of the LLM 204 (or any of the plurality of diagnostic machine learning models 504), via backpropagation (e.g., stochastic gradient descent) based on the computed error.

In various cases, such execution-and-update procedure can be repeated for any suitable number input-annotation pairs. This can ultimately cause the trainable internal parameters of the LLM 204 (or any of the plurality of diagnostic machine learning models 504) to become iteratively optimized for accurately generating synthesized textual content (or respective medical or clinical inferencing task results). In various aspects, the training component 1002 can utilize any suitable training batch sizes, any suitable error/loss functions, or any suitable training termination criteria.

Although the herein disclosure mainly describes the LLM 204 or any of the plurality of diagnostic machine learning models 504 as being trained in supervised fashion, this is a mere non-limiting example for ease of explanation and illustration. In various embodiments, any other suitable training paradigm can be used to train the LLM 204 or any of the plurality of diagnostic machine learning models 504, such as unsupervised training, semi-supervised training, or reinforcement learning, any of which can be facilitated in a centralized or federated fashion.

Although the herein disclosure mainly describes various embodiments in which the LLM 204 generates synthesized text, this is a mere non-limiting example for ease of explanation and illustration. In various other embodiments, the LLM 204 can be configured to synthesize any other suitable type or format of electronic data (e.g., is not limited just to text synthesis). Indeed, in some cases, the LLM 204 can be configured to produce numerical results (e.g., scalars, vectors, matrices, tensors) or graphical results (e.g., pie charts, bar graphs, histograms, images). In various aspects, such other types of data synthesis can be facilitated by any suitable function calling techniques (e.g., the LLM 204 can synthesize textual arguments for different graphical or numerical functions, and the model component 118 can execute such graphical or numerical functions using or otherwise according to such textual arguments).

Although the herein disclosure mainly describes various embodiments in which the LLM 204 is executed in RAG-fashion using the plurality of inferencing task results 602 as references, this is a mere non-limiting example for ease of explanation and illustration. In various embodiments, any other suitable information can be included or treated as a RAG reference for the LLM 204, such as: user guides, service manuals, or maintenance manuals of the medical device 104; schematics or bills of materials for the medical device 104; or medical research, medical standards, or clinical publications.

As a non-limiting example, suppose that the user of the medical device 104 asks a natural language question regarding how to operate the medical device 104 (e.g., how to invoke or configure a particular functionality of the medical device 104). In such case, that natural language question can be transcribed into plain text; an embedding for that plain text can be computed by the encoder portion 302; respective embeddings for any suitable chapters, pages, sections, or paragraphs of user guides or service manuals of the medical device 104 can also be computed by the encoder portion 302; those embeddings can be leveraged to identify portions of those user guides or service manuals that are substantively relevant to the plain text; and both the plain text and those relevant portions can be fed as input to the LLM 204, thereby causing the LLM 204 to synthesize an electronic answer for the natural language question (e.g., that explains or describes how to invoke or configure the particular functionality of the medical device 104).

As another non-limiting example, suppose that the user of the medical device 104 asks a natural language question regarding current clinical best-practices (e.g., asks how a particular symptom uncovered by the medical device 104 should be treated). In such case, that natural language question can be transcribed into plain text; an embedding for that plain text can be computed by the encoder portion 302; respective embeddings for any suitable chapters, pages, sections, or paragraphs of medical research papers or clinical standards reports can also be computed by the encoder portion 302; those embeddings can be leveraged to identify portions of those medical research papers or clinical standards reports that are substantively relevant to the plain text; and both the plain text and those relevant portions can be fed as input to the LLM 204, thereby causing the LLM 204 to synthesize an electronic answer for the natural language question (e.g., that explains or describes how the particular symptom uncovered by the medical device 104 should be treated).

It should be appreciated that the model component 118 can, in various embodiments, implement any suitable language translation techniques or tools as appropriate. As a non-limiting example, suppose that the natural language sentence 202 is not in whatever language on which the LLM 204 was trained. In such case, the model component 118 can translate the natural language sentence 202 into such language and can perform embedding similarity comparisons using that translated version of the natural language sentence 202. As another non-limiting example, suppose that the natural language sentence 502 is not in whatever language on which the LLM 204 was trained. In such case, the model component 118 can translate the natural language sentence 502 into such language and can generate the natural language answer 506 based on that translated version of the natural language sentence 502. Furthermore, in such case, the model component 118 can commensurately translate the natural language answer 506 into whatever language that the natural language sentence 502 was originally in.

It should be appreciated that various embodiments described herein can implement any suitable security procedures so as to ensure that unauthorized entities are not able to use or abuse touchless operation of the medical device 104. For instance, in some aspects, the model component 118 can perform any suitable authorization check prior to executing the LLM 204 (or any portion thereof) on any given natural language sentence. If the authorization check is passed, the model component 118 can utilize the LLM 204 to answer or otherwise respond to that given natural language sentence as described herein. However, if the authorization check is failed, then the model component 118 can instead refrain from answering or otherwise responding to that given natural language sentence. In various cases, the authorization check can involve any suitable touchless biometric verification of the user of the medical device 104 (e.g., of whomever speaks or otherwise provides the given natural language sentence). As a non-limiting example, the authorization check can involve retina scanning. In such case, the given natural language sentence can be answered only if a retinal image of the user matches any of a plurality of stored retinal images that are known to respectively correspond to authorized personnel. As another non-limiting example, the authorization check can involve voice recognition. In such case, the given natural language sentence can be answered only if a voice recording or vocal signature of the user matches (e.g., in terms of pitch, timbre, or intonation) any of a plurality of stored voice recordings or vocal signatures that are known to respectively correspond to authorized personnel. In other cases, the authorization check can involve any other suitable mechanism for facilitating touchless user identification verification, such as the use of radio-frequency identification (RFID) badges (e.g., the model component 118 can refrain from responding to spoken questions or sentences unless at least one known or recognized RFID badge is within a threshold proximity of the medical device 104). In some instances, any suitable combination of touchless security measures can be implemented (e.g., the model component 118 can refrain from responding to spoken questions or sentences unless the user of the medical device 104 presents a known RFID badge and provides a recognized or acceptable voice recording or vocal signature).

As described herein, the LLM 204 can be leveraged in order to touchlessly cause the medical device 104 to perform the identified equipment operation 206. It should be appreciated that, in various aspects, the model component 118 can, before instructing or commanding the medical device 104 to perform the identified equipment operation 206, prompt the user of the medical device 104 to confirm or verify that they truly or actually desire that the identified equipment operation 206 be performed. If the user confirms or verifies (e.g., by vocalizing "yes" or "correct"), then the model component 118 can proceed with causing the medical device 104 to perform the identified equipment operation 206. On the other hand, if the user does not confirm or verify (e.g., by vocalizing "no" or "incorrect"), then the model component 118 can instead refrain from causing the medical device 104 to perform the identified equipment operation 206. In some cases, the model component 118 can facilitate such confirmation or verification no matter what. In other cases, the model component 118 can instead facilitate such confirmation or verification only when the identified equipment operation 206 is clinically consequential or important (e.g., when the identified equipment operation 206 is known or deemed to correspond to more than a threshold level of clinical risk), and the model component 118 can refrain from facilitating such confirmation or verification when the identified equipment operation 206 is not clinically consequential or important (e.g., when the identified equipment operation 206 is known or deemed to correspond to less than the threshold level of clinical risk). As a non-limiting example, powering down a neonatal warmer or adjusting an infusion pump can be considered as much more clinically consequential, risky, or important as compared to dimming lights or adjusting angle of reclination of a hospital bed.

Figure 12:
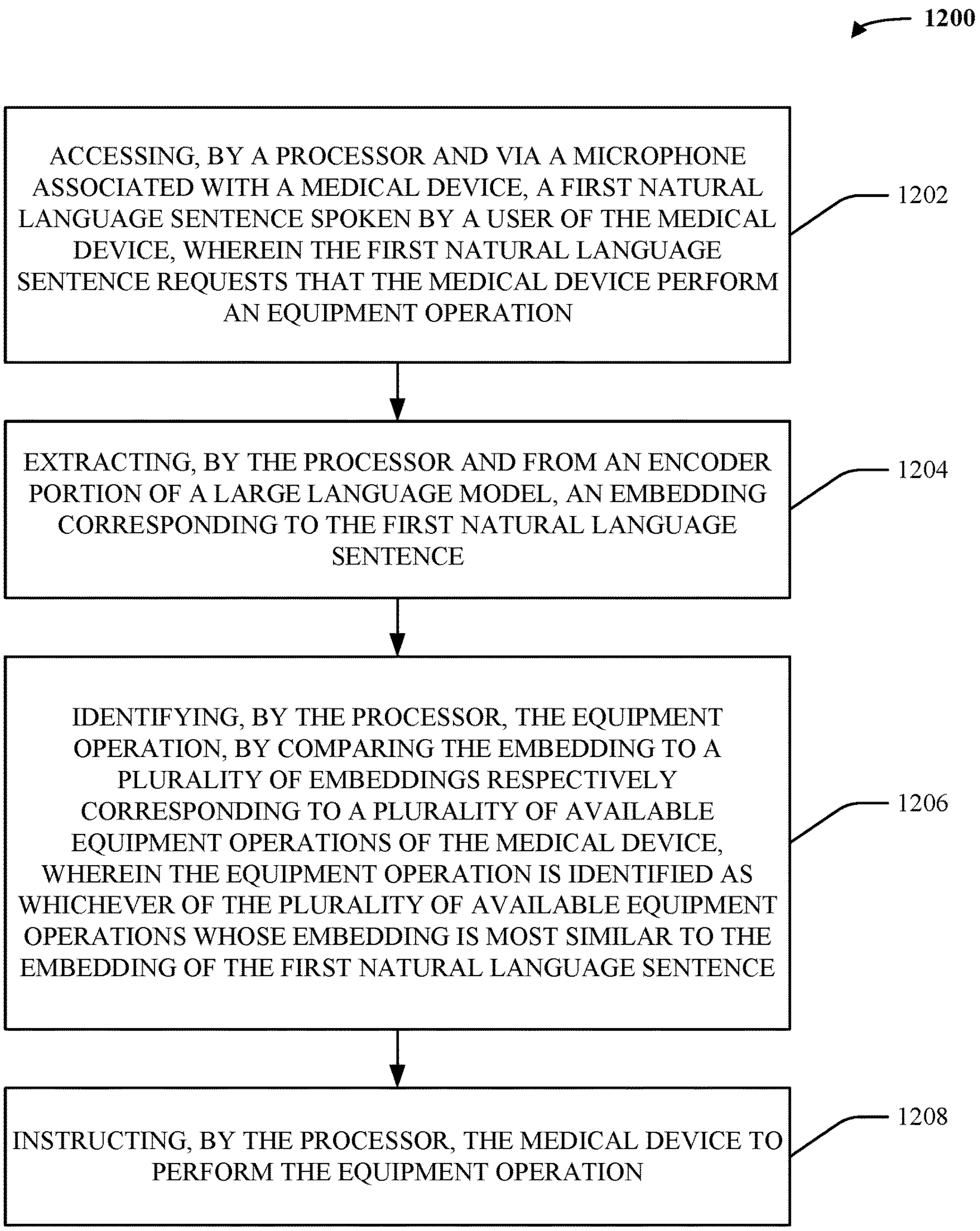
FIG. 12 illustrates a flow diagram of an example, non-limiting computer-implemented method that facilitates touchless operation of medical devices via large language models in accordance with one or more embodiments described herein.

FIG. 12 illustrates a flow diagram of an example, non-limiting computer-implemented method 1200 that can facilitate touchless operation of medical devices via large language models in accordance with one or more embodiments described herein. In various cases, the touchless operation system 102 can facilitate the computer-implemented method 1200.

In various embodiments, act 1202 can include accessing, by a processor (e.g., 112) and via a microphone associated with a medical device (e.g., 104), a first natural language sentence (e.g., 202) spoken by a user of the medical device. In various cases, the first natural language sentence can request that the medical device perform an equipment operation.

In various aspects, act 1204 can include extracting, by the processor and from an encoder portion (e.g., 302) of a large language model (e.g., 204), an embedding (e.g., 306) corresponding to the first natural language sentence.

In various instances, act 1206 can include identifying, by the processor, the equipment operation (e.g., 506), by comparing the embedding to a plurality of embeddings (e.g., 404) respectively corresponding to a plurality of available equipment operations (e.g., 108) of the medical device. In various cases, the equipment operation can be identified as whichever of the plurality of available equipment operations whose embedding is most similar to the embedding of the first natural language sentence.

In various aspects, act 1208 can include instructing, by the processor, the medical device to perform the equipment operation.

Although not explicitly shown in FIG. 12, the plurality of embeddings can be generated by the encoder portion of the large language model, based on a plurality of natural language descriptions (e.g., 402) respectively corresponding to the plurality of available equipment operations.

Although not explicitly shown in FIG. 12, the processor can measure embedding similarity via cosine similarity computation or Euclidean distance computation.

Although not explicitly shown in FIG. 12, the computer-implemented method 1200 can include: prompting, by the processor, the user to confirm the equipment operation, in response to a determination that the equipment operation is associated with more than a threshold level of clinical risk.

Although not explicitly shown in FIG. 12, the computer-implemented method 1200 can include: accessing, by the processor and via the microphone of the medical device, a second natural language sentence (e.g., 502) spoken by the user of the medical device, wherein the second natural language sentence can ask about a medical patient (e.g., 106) being monitored by the medical device; and generating, by the processor, a natural language answer (e.g., 506) for the second natural language sentence, by executing the large language model on the second natural language sentence in retrieval-augmented generative fashion using a plurality of inferencing task results (e.g., 602) as references, wherein the plurality of inferencing task results can be produced by respectively executing a plurality of artificial intelligence models (e.g., 504) on health data (e.g., 110) of the medical patient captured or recorded by the medical device.

Although not explicitly shown in FIG. 12, the computer-implemented method 1200 can include audibly playing, by the processor, the natural language answer on a speaker of the medical device.

Although not explicitly shown in FIG. 12, the computer-implemented method 1200 can include visually rendering, by the processor, the natural language answer on an electronic display of the medical device.

Although not explicitly shown in FIG. 12, the computer-implemented method 1200 can include verifying, by the processor and via voice recognition, that the user is authorized to touchlessly operate the medical device.

Although not explicitly shown in FIG. 12, the processor can translate the first natural language sentence into a language on which the large language model was trained.

A mere non-limiting example of various embodiments described herein can be as follows. The medical device 104 can be an automated neonatal care-station, such as the Giraffe Omnibed. In some situations, a clinician who is using the neonatal care-station might have both hands inside an incubator chamber (e.g., arms protruding through chamber portals) of the neonatal care-station (e.g., to facilitate infant feeding, to adjust tubing or masks associated with the infant, or to change wound dressings of the infant). In other situations, the clinician can desire to not physically interact with or otherwise touch screens, handles, keyboards, or buttons of the neonatal care-station (e.g., so as to limit the transmission of pathogens from or to the neonatal care-station or from or to the infant). In any of such cases, the clinicians can desire to touchlessly interact with or otherwise operate the neonatal care-station. In various aspects, such touchless operation can be facilitated as described herein. Non-limiting examples of equipment operations that the clinician can touchlessly invoke can include: setting an alarm threshold for the neonatal care-station (e.g., if a sensor, such as a temperature sensor or blood pressure sensor, of the neonatal care-station records a reading that fails to satisfy the threshold, the neonatal care-station can begin to sound an alarm); turning off an alarm that is sounded by the neonatal care-station; turning off, turning on, or otherwise adjusting cameras or other video monitoring equipment of the neonatal care-station; displaying an oxygen saturation reading or trend of the infant as measured by the neonatal care-station; increasing or decreasing a temperature of the incubator chamber of the neonatal care-station (e.g., indeed, when the clinician is working with both hands in the incubator chamber, the internal temperature of the incubator chamber can drop below desired levels due to air flowing through the chamber portals, and the clinician can desire to counteract such temperature drop); or measuring or displaying a weight of the infant. Any of such equipment operations can be considered as desirable (e.g., even critical, in some situations), but such equipment operations can be difficult or undesirable to perform in a tactile fashion (e.g., if both hands of the clinician are busy, the clinician can be unable to tactilely invoke such equipment operations; even if both hands of the clinician are not busy, the clinician can desire to not tactilely invoke such equipment operations, due to the risk of contamination or disease transmission with respect to the infant, especially for premature infants with fragile skin and immune systems).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 13:
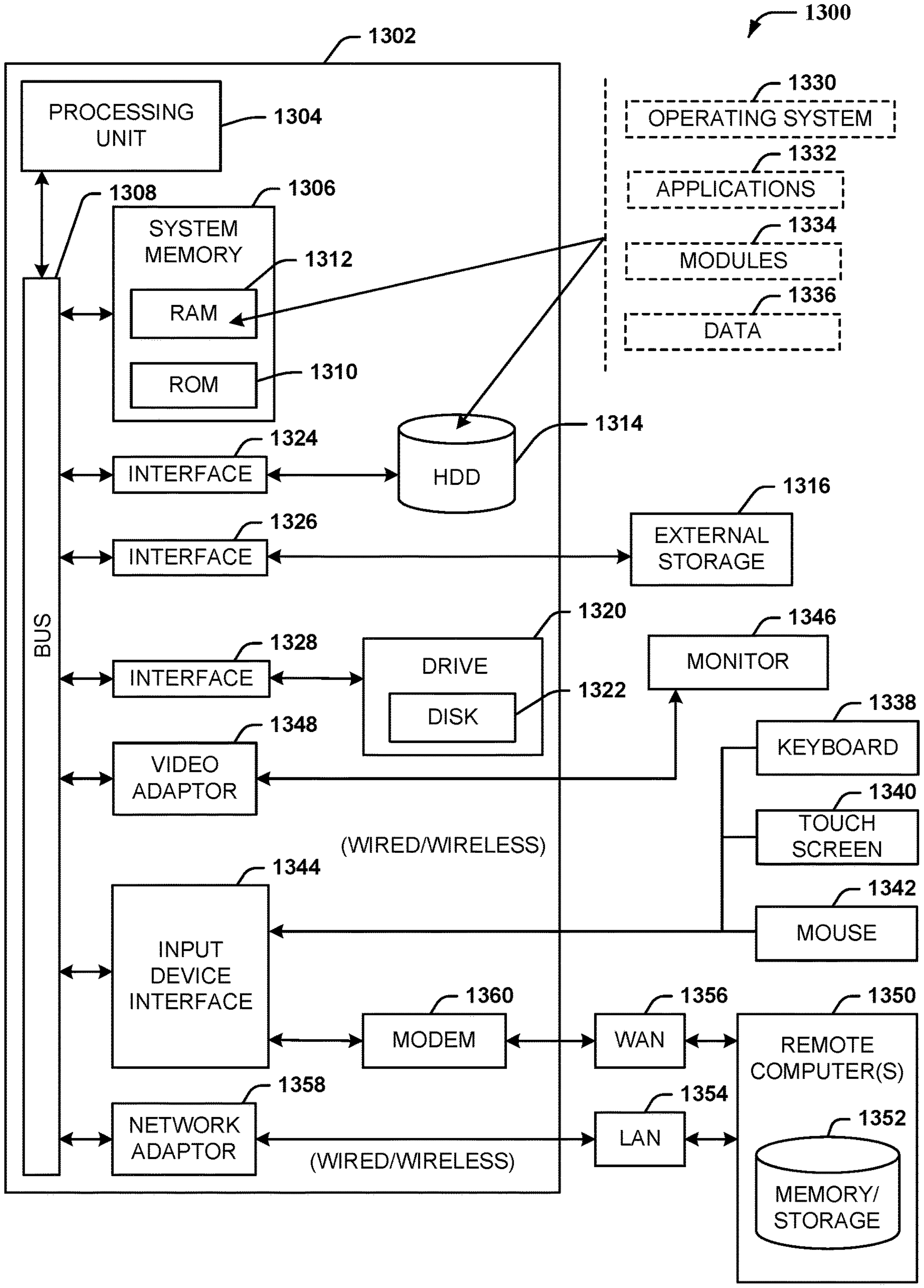
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN

1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
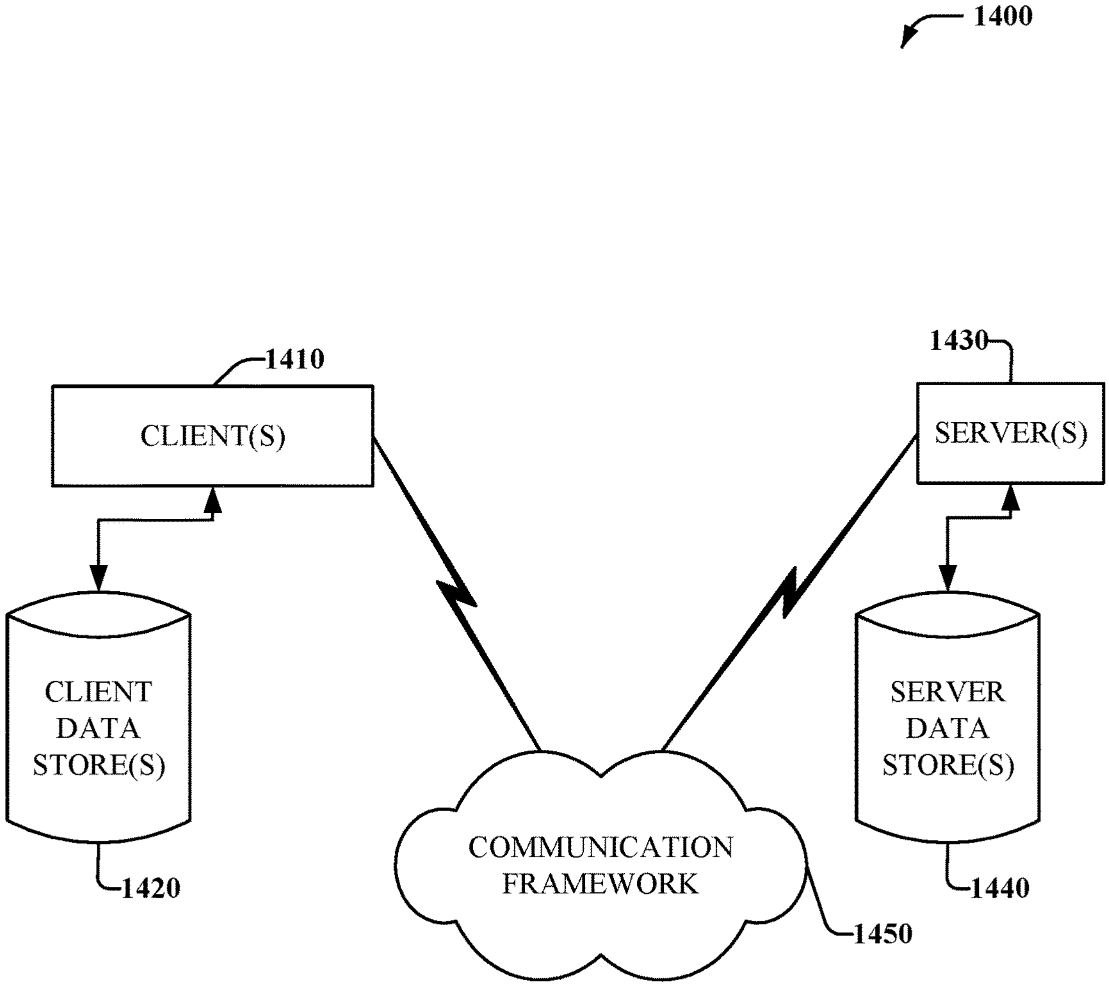
FIG. 14 illustrates an example networking environment operable to execute various implementations described herein.

FIG. 14 is a schematic block diagram of a sample computing environment 1400 with which the disclosed subject matter can interact. The sample computing environment 1400 includes one or more client(s) 1410. The client(s) 1410 can be hardware or software (e.g., threads, processes, computing devices). The sample computing environment 1400 also includes one or more server(s) 1430. The server(s) 1430 can also be hardware or software (e.g., threads, processes, computing devices). The servers 1430 can house threads to perform transformations by employing one or more embodiments as described herein, for example. One possible communication between a client 1410 and a server 1430 can be in the form of a data packet adapted to be transmitted between two or more computer processes. The sample computing environment 1400 includes a communication framework 1450 that can be employed to facilitate communications between the client(s) 1410 and the server(s) 1430. The client(s) 1410 are operably connected to one or more client data store(s) 1420 that can be employed to store information local to the client(s) 1410. Similarly, the server(s) 1430 are operably connected to one or more server data store(s) 1440 that can be employed to store information local to the servers 1430.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a solid state drive such as M.2 (including non-volatile memory express (NVMe) or serial advanced technology attachment (SATA)), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a non-transitory computer-readable memory, wherein the computer-executable components comprise:

an access component that receives, via a microphone associated with a medical device, a first natural language sentence and a second natural language sentence spoken by a user of the medical device, wherein the first natural language sentence requests that the medical device perform an equipment operation, wherein the second natural language sentence comprises a query regarding a patient of the medical device, and wherein the access component accesses input data associated with the patient; and a model component that:

extracts, using an encoder portion of a large language model, a first embedding corresponding to the first natural language sentence and a second embedding corresponding to the second natural language sentence;

compares the first embedding to a plurality of stored embeddings respectively corresponding to natural language descriptions of a plurality of available equipment operations of the medical device, each equipment operation corresponding to a controllable actuator of the medical device;

identifies an equipment operation whose corresponding stored embedding is most similar to the first embedding and whose similarity exceeds a similarity confidence threshold;

in response to the similarity exceeding the similarity confidence threshold, instructs, via an instruction command communicated to the medical device, the medical device to perform the equipment operation by activating the controllable actuator corresponding to the equipment operation;

executes a plurality of machine learning models on the input data to generate a plurality of inferencing outputs associated with the patient;

generates respective third embeddings corresponding to the plurality of inferencing outputs using the encoder portion of the large language model;

selects a subset of the plurality of inferencing outputs based on similarity between the second embedding and the respective third embeddings; and generates a response to the query based on the subset using a generative portion of the large language model.

2. The system of claim 1, wherein the model component generates, via the encoder portion of the large language model, the plurality of stored embeddings based on the natural language descriptions.

3. The system of claim 1, wherein the model component prompts the user to confirm the equipment operation, in response to a determination that the equipment operation is associated with more than a threshold level of clinical risk.

4. The system of claim 1, wherein the input data comprises health data of the patient as captured or recorded by the medical device.

5. The system of claim 1, wherein the model component verifies, via voice recognition, that the user is authorized to touchlessly operate the medical device.

6. The system of claim 1, wherein the model component translates the first natural language sentence into a language on which the large language model was trained.

7. The system of claim 1, wherein the input data comprises measured health data acquired by the medical device, and wherein the model component is further configured to:

evaluate the measured health data to determine whether execution of the equipment operation satisfies a predefined safety condition; and instruct the actuator to perform the equipment operation only when the predefined safety condition is satisfied.

8. The system of claim 7, wherein the predefined safety condition is specific to the equipment operation and comprises at least one of: a permissible physiological range, a permissible device temperature, a permissible actuator position, or a permissible patient-safety parameter.

9. The system of claim 7, wherein when the predefined safety condition is not satisfied, the model component is configured to inhibit execution of the equipment operation and generate a natural language explanation indicating why the equipment operation is unsafe.

10. The system of claim 1, wherein the input data comprises a plurality of sensor signals acquired by the medical device, the plurality of sensor signals including at least one of: a physiological monitoring signal, an imaging signal, or an environmental sensor signal.

11. The system of claim 1, wherein the model component applies output of a diagnostic machine-learning model executed by the medical device to refine identification of the equipment operation, wherein the diagnostic machine-learning model processes sensor data acquired by the medical device.

12. A computer-implemented method, comprising:

receiving, by a processor via a microphone associated with a medical device, to receive a first natural language sentence spoken by a user of the medical device, wherein the first natural language sentence requests that the medical device perform an equipment operation;

extracting, by the processor and using an encoder portion of a large language model, a first embedding corresponding to the first natural language sentence;

comparing, by the processor, the first embedding to a plurality of stored embeddings respectively corresponding to natural language descriptions of a plurality of available equipment operations of the medical device, each equipment operation corresponding to a controllable actuator of the medical device;

identifying, by the processor, an equipment operation whose stored embedding is most similar to the first embedding and whose similarity exceeds a similarity confidence threshold;

in response to the similarity exceeding the similarity confidence threshold, instructing, by the processor via an instruction command communicated to the medical device, the medical device to perform the equipment operation by activating the controllable actuator corresponding to the equipment operation;

receiving, by the processor via the microphone, a second natural language sentence spoken by the user, wherein the second natural language sentence and comprises a query regarding a patient associated with the medical device;

accessing, by the processor, input data associated with the patient;

extracting, by the processor and using the encoder portion of the large language model, a second embedding corresponding to the second natural language sentence;

executing, by the processor, a plurality of machine learning models on the input data to generate a plurality of inferencing outputs associated with the patient;

generating, by the processor and using the encoder portion of the large language model, respective third embeddings corresponding to the plurality of inferencing outputs;

selecting, by the processor, a subset of the plurality of inferencing outputs based on similarity between the second embedding and the respective third embeddings; and generating, by the processor, a response to the query based on the subset and using a generative portion of the large language model.

13. The computer-implemented method of claim 12, further comprising:

generating, by the processor via the encoder portion of the large language model, the plurality of stored embeddings based on the natural language descriptions.

14. The computer-implemented method of claim 12, further comprising:

prompting, by the processor, the user to confirm the equipment operation, in response to a determination that the equipment operation is associated with more than a threshold level of clinical risk.

15. The computer-implemented method of claim 12, wherein the input data comprises health data of the patient as captured or recorded by the medical device.

16. The computer-implemented method of claim 15, further comprising:

verifying, by the processor and via voice recognition, that the user is authorized to touchlessly operate the medical device.

17. The computer-implemented method of claim 12, wherein the processor translates the first natural language sentence into a language on which the large language model was trained.

18. The computer-implemented method of claim 12, wherein generating the response comprises providing only the subset of the plurality of inferencing outputs as input context to the generative portion of the large language model.

19. A computer program product for facilitating touchless operation of medical devices, the computer program product comprising a non-transitory computer-readable memory having program instructions embodied therewith, the program instructions executable by a processor to cause the processor to:

receive, via a microphone of a medical device, a natural language sentence spoken by a user of the medical device, wherein the first natural language sentence requests that the medical device perform an equipment operation;

extract, using an encoder portion of a large language model, first embedding corresponding to the natural language sentence;

compares the first embedding to a plurality of stored embeddings respectively corresponding to natural language descriptions of a plurality of available equipment operations of the medical device, each equipment operation corresponding to a controllable actuator of the medical device;

identifies an equipment operation whose corresponding stored embedding is most similar to the first embedding and whose similarity exceeds a similarity confidence threshold; and in response to the similarity exceeding the similarity confidence threshold, instructs, via an instruction command communicated to the medical device, the medical device to perform the equipment operation by activating the controllable actuator corresponding to the equipment operation;

receive, via the microphone, a second natural language sentence spoken by the user, wherein the second natural language sentence and comprises a query regarding a patient associated with the medical device;

access input data associated with the patient;

extract, using the encoder portion of the large language model, a second embedding corresponding to the second natural language sentence;

execute a plurality of machine learning models on the input data to generate a plurality of inferencing outputs associated with the patient;

generate, by the processor using the encoder portion of the large language model, respective third embeddings corresponding to the plurality of inferencing outputs;

select a subset of the plurality of inferencing outputs based on similarity between the second embedding and the respective third embeddings; and generate a response to the query based on the subset and using a generative portion of the large language model.

20. The computer program product of claim 19, wherein the medical device is a neonatal care-station, wherein the input data comprises monitored patient data captured by the neonatal care-station, and wherein the plurality of available equipment operations comprise: setting an automated alarm threshold of the medical device; deactivating an automated alarm that is sounded by the medical device; displaying patient data that is recorded by the medical device; or adjusting a temperature of the medical device.

* * * * *